US011999608B2

(12) United States Patent
Robinson et al.

(10) Patent No.: US 11,999,608 B2
(45) Date of Patent: Jun. 4, 2024

(54) PRODUCT DELIVERY SYSTEMS FOR LIQUID PRODUCT TRANSPORT VEHICLES AND METHODS OF LOADING LIQUID PRODUCTS USING THE SAME

(71) Applicant: Knappco, LLC, Hamilton, OH (US)

(72) Inventors: Randy Donald Robinson, Smithville, MO (US); Mark William Dudley, Kansas City, MO (US); Steven D. Gramling, Olathe, KS (US); Richard Lee Henderson, Leawood, KS (US); Francis V. Stemporzewski, Jr., Salem, NH (US)

(73) Assignee: Knappco, LLC, Hamilton, OH (US)

( * ) Notice: Subject to any disclaimer, the term of this patent is extended or adjusted under 35 U.S.C. 154(b) by 0 days.

(21) Appl. No.: 17/997,083

(22) PCT Filed: Apr. 12, 2021

(86) PCT No.: PCT/US2021/026829
§ 371 (c)(1),
(2) Date: Oct. 25, 2022

(87) PCT Pub. No.: WO2021/221889
PCT Pub. Date: Nov. 4, 2021

(65) Prior Publication Data
US 2023/0174366 A1 Jun. 8, 2023

Related U.S. Application Data

(60) Provisional application No. 63/018,741, filed on May 1, 2020.

(51) Int. Cl.
*B67D 7/14* (2010.01)
*B60P 3/22* (2006.01)
(Continued)

(52) U.S. Cl.
CPC .............. *B67D 7/145* (2013.01); *B60P 3/228* (2013.01); *B67D 7/04* (2013.01); *B67D 7/303* (2013.01);
(Continued)

(58) Field of Classification Search
CPC .......... B67D 7/04; B67D 7/362; B67D 7/303; B67D 7/30; B67D 2007/0453; B67D 2007/0459
See application file for complete search history.

(56) References Cited

U.S. PATENT DOCUMENTS 5,507,326 A 4/1996 Cadman et al.
5,605,182 A 2/1997 Oberrecht et al.
(Continued)

FOREIGN PATENT DOCUMENTS

EP 3296937 A1 3/2018
WO 2018094413 A1 5/2018

OTHER PUBLICATIONS

International Search Report and Written Opinion dated Sep. 3, 2021, pertaining to Int'l Patent Application No. PCT/US2021/026829, 21 pgs.

*Primary Examiner* — Timothy L Maust
(74) *Attorney, Agent, or Firm* — Dinsmore & Shohl LLP

(57) ABSTRACT

A product delivery system includes a product transport vehicle having at least a plurality of tank compartments, internal valves, control valves, fluid property sensors, temperature sensors, overfill sensors, pressure sensors, a system controller, and a memory module. The product delivery system may be operable to communicatively connect with the loading system at a loading station, a fleet management system, or a cloud system to obtain information, such as the amount of liquid product to be loaded into a tank compartment. The product delivery system may be operable to compare the volumes of the tank compartments with the (Continued)

amounts of liquid product to be loaded at a loading station and maintain the internal valve or control valve in a locked state or transition the internal valve or control valve to an unlocked state based on the comparison. Other comparisons based on liquid type or distribution tank volume can also be made.

20 Claims, 6 Drawing Sheets

(51) Int. Cl.
  *B67D 7/04*   (2010.01)
  *B67D 7/30*   (2010.01)
  *B67D 7/32*   (2010.01)
  *B67D 7/34*   (2010.01)
  *B67D 7/78*   (2010.01)
  *H04W 4/021*   (2018.01)

(52) U.S. Cl.
  CPC ........... *B67D 7/3209* (2013.01); *B67D 7/342* (2013.01); *B67D 7/78* (2013.01); *H04W 4/021* (2013.01)

(56) References Cited

U.S. PATENT DOCUMENTS

| | | | |
|---|---|---|---|
| 8,051,882 B2* | 11/2011 | Koeninger | B67D 7/3209 |
| | | | 141/98 |
| 8,593,290 B2 | 11/2013 | Hunter et al. | |
| 8,731,725 B2 | 5/2014 | Trottier et al. | |
| 9,715,241 B2 | 7/2017 | Mixon | |
| 9,823,665 B2* | 11/2017 | Finnell | B67D 7/344 |
| 9,850,119 B2* | 12/2017 | Westrich | B67D 7/362 |
| 9,969,604 B2* | 5/2018 | Koeninger | B67D 7/04 |
| 10,207,912 B2* | 2/2019 | Nelson | B67D 7/348 |
| 10,392,240 B1* | 8/2019 | Hacohen | G06Q 20/0855 |
| 10,407,296 B2 | 9/2019 | Bjornebo et al. | |
| 10,787,358 B2* | 9/2020 | Dudley | B67D 7/362 |
| 11,034,574 B1* | 6/2021 | Sisson | B60P 3/2245 |
| 11,519,770 B1* | 12/2022 | Morris | B67D 7/145 |
| 2004/0085200 A1 | 5/2004 | McConnel et al. | |
| 2011/0120589 A1 | 5/2011 | Evans | |
| 2015/0186837 A1* | 7/2015 | Bianco | G06Q 10/087 |
| | | | 235/381 |
| 2016/0130130 A1 | 5/2016 | Nelson et al. | |
| 2017/0174501 A1* | 6/2017 | Dudar | B67D 7/0492 |

* cited by examiner

PRODUCT DELIVERY SYSTEMS FOR LIQUID PRODUCT TRANSPORT VEHICLES AND METHODS OF LOADING LIQUID PRODUCTS USING THE SAME

CROSS-REFERENCE TO RELATED APPLICATIONS

The present application is a National Stage Entry under 35 U.S.C. § 371 of International Patent Application No. PCT/US2021/026829 filed Apr. 12, 2021, which claims the benefit of priority to U.S. Provisional Patent Application No. 63/018,741 filed on May 1, 2020, and entitled "Product Delivery Systems for Liquid Product Transport Vehicles and Methods of Loading Liquid Products Using the Same," the entire contents of which are incorporated by reference in the present disclosure.

BACKGROUND

Field

The present specification generally relates to product delivery systems for liquid product transport vehicles and, more specifically, to product delivery systems operable to reduce errors during loading of liquid product transport vehicles.

Technical Background

Distribution of liquid products, such as liquid fuels for vehicles, may generally include loading one or more liquid products on a product transport vehicle at a loading location, transporting the liquid products to a distribution station, and unloading the liquid products from the product transport vehicle into a distribution tank or container at the distribution station. The product transport vehicle typically includes multiple tank compartments that may each have different volumes. Additionally, the distribution tanks may vary in volume from distribution station to distribution station due to use requirements at different locations, such as gas stations. Efficient distribution of liquid products may depend on utilization of the volumes of each of the tank compartments of the product transport vehicle as well as consideration of the available volumes in the distribution tanks at distribution facilities. Additionally, variances between the volumes of liquid product to ship, the available volume in the tank compartments of the product transport vehicle, and the available volume in the distribution tanks at the distribution locations may cause problems in the loading process, such as an overfill condition, cross-contamination, or product retain.

Additionally, problems can arise during loading of one or more tank compartments of the product transport vehicle at a loading station. Examples of problems that may arise during loading of a tank compartment at a loading station may include but are not limited to, mismatch between the volume to be shipped and the volume of the tank compartment, product retain in the tank compartment, incorrect liquid product transferred into the tank compartment, incompatibility of the liquid product with previously transported materials, or other problems.

SUMMARY

Ongoing needs exist for product delivery systems and methods for product transport vehicles to reduce or prevent errors in loading and unloading tank compartments of the product transport vehicle and to improve utilization of the product transport vehicles. The present disclosure is directed to a product delivery system that can connect with a loading system at a loading station, a fleet management system, a cloud system, or combinations of these. The product delivery system can control the loading process to reduce operator errors during the loading process, in particular errors based on liquid volume mismatches and liquid type mismatches. The product delivery system may be coupled to the product transport vehicle. The product delivery system may be operable to communicatively connect to and communicate with the loading system at the loading station a fleet management system, and/or a cloud system. Through communication with the loading system, the fleet management system, and/or a cloud system, the product delivery system may obtain the shipping volumes and product types of the liquid products to be loaded and transported from the loading system, the fleet management system, and/or the cloud system. The product delivery system may store information on the volume, retain status, and previously transported liquid product type for each of the tank compartments of the product transport vehicle. The product delivery system may allow loading of the tank compartment when the volume to be loaded matches the volume of the tank compartment and any other conditions (e.g., product type matches) are satisfied. By comparing the amount of liquid product to be transported to the available volume in the tank compartments of the product transport vehicle and/or the available volume in the distribution tanks at the distribution station, the product delivery system disclosed herein can reduce loading errors, such as overfill conditions, cross-contamination, and product retain, and can improve product transport vehicle utilization by reducing under filling of tank compartments.

According to a first aspect, a product delivery system can include a product transport vehicle comprising a tank compartment for containing a liquid product. A valve may be coupled to the tank compartment, the valve regulating a flow of the liquid product into the tank compartment and having a normally locked state. A network interface device may be operable to establish a communication path with one or more external systems. A system controller may be communicatively coupled to the valve and the network interface device. The system controller may include a processor and a storage medium containing computer readable and executable instructions which, when executed by the processor, cause the system controller to automatically establish a communication path between the network interface device and a loading system at a loading station, a fleet management system, a cloud system, or combinations of these, receive a shipping volume from the loading system, the fleet management system, and/or the cloud system, wherein the shipping volume is a volume of a liquid product scheduled to be loaded into the tank compartment, compare the shipping volume to a tank compartment volume of the tank compartment. The tank compartment volume may be stored in the storage medium, maintain the valve in the normally locked state based on the comparison of the shipping volume and the tank compartment volume to prevent the flow of the liquid product to be loaded into the tank compartment, and transition the valve from the normally locked state to an unlocked state based on the comparison of the shipping volume and the tank compartment volume, thereby permitting the flow of the liquid product to be loaded into the tank compartment.

A second aspect of the present disclosure may include the first aspect, wherein the computer readable and executable instructions, when executed by the processor, may further cause the system controller to maintain the valve in the normally locked state when the shipping volume and the tank compartment volume differ by greater than or equal to a threshold amount to prevent the flow of the liquid product to be loaded into the tank compartment and transition the valve from the normally locked state to an unlocked state when the shipping volume and the tank compartment volume differ by less than the threshold amount thereby permitting the flow of the liquid product to be loaded into the tank compartment.

A third aspect of the present disclosure may include either one of the first or second aspects, wherein the computer readable and executable instructions, when executed by the processor, may further cause the system controller to maintain the valve in the normally locked state when the shipping volume and the tank compartment volume differ by greater than or equal to a threshold percentage of the tank compartment volume to prevent the flow of the liquid product to be loaded into the tank compartment and transition the valve from the normally locked state to an unlocked state when the shipping volume and the tank compartment volume differ by less than the threshold percentage of the tank compartment volume, thereby permitting the flow of the liquid product to be loaded into the tank compartment.

A fourth aspect of the present disclosure may include any one of the first through third aspects, wherein the executable instructions, when executed by the processor, may cause the system controller to automatically receive a destination volume from the loading system, the fleet management system, the cloud system, or a distribution station control unit at a distribution station, wherein the destination volume is an available volume in a distribution tank at a distribution station to which the product is to be delivered; compare the shipping volume to the destination volume, the tank compartment volume of the tank compartment, or both; maintain the valve in the normally locked state based on the comparison of the shipping volume to the destination volume, the tank compartment volume, or both to prevent the flow of the liquid product to be loaded into the tank compartment; and transition the valve from the normally locked state to an unlocked state based on the comparison of the shipping volume to the destination volume, the tank compartment volume, or both, thereby permitting the flow of the liquid product to be loaded into the tank compartment.

A fifth aspect of the present disclosure may include any one of the first through fourth aspects, further comprising a fluid property sensor coupled to the tank compartment or the valve and communicatively coupled to the system controller. The fluid property sensor may be operable to determine a transported liquid type of the liquid product in the tank compartment.

A sixth aspect of the present disclosure may include the fifth aspect, wherein the transported liquid type may be determined from one or more of a density, viscosity, dielectric constant, light transmissivity, fluorescent property, or combinations of these, which may be measured by the fluid property sensor.

A seventh aspect of the present disclosure may include the sixth aspect, wherein the computer readable and executable instructions, when executed by the processor, may further cause the system controller to receive a fluid property signal from the fluid property sensor indicative of the transported liquid type of the liquid product in the tank compartment; determine the transported liquid type from the signal received from the fluid property sensor or from a transported liquid type parameter stored on the storage medium; receive a shipping liquid type of the liquid product to be loaded into the tank compartment; compare the shipping liquid type to the transported liquid type; maintain the valve in the normally locked state when the shipping liquid type and the transported liquid type do not match to prevent the flow of the liquid product to be loaded into the tank compartment; and transition the valve from the normally locked state to an unlocked state when shipping liquid type and the transported liquid type match and based on the comparison of the shipping volume to the tank compartment volume, thereby permitting the flow of the liquid product to be loaded into the tank compartment.

An eighth aspect of the present disclosure may include the seventh aspect, wherein the executable instructions, when executed by the processor, cause the system controller to automatically receive a distribution liquid type of the liquid product in a distribution tank at a distribution station from the loading system, the fleet management system, the cloud system, or a distribution station control unit; compare the shipping liquid type to the distribution liquid type, the transported liquid type, or both; maintain the valve in the normally locked state when the shipping liquid type, the transported liquid type, and the distribution liquid type do not match to prevent the flow of the liquid product to be loaded into the tank compartment; and transition the valve from the normally locked state to an unlocked state when shipping liquid type, the transported liquid type, and the distribution liquid type match and based on the comparison of the shipping liquid volume to the tank compartment volume, thereby permitting the flow of the liquid product to be loaded into the tank compartment.

A ninth aspect of the present disclosure may include either one of the seventh or eighth aspects, further comprising an overfill detection system communicatively coupled to the system controller, wherein the computer readable and executable instructions, when executed by the processor, may further cause the system controller to transmit an overfill condition to the overfill detection system, wherein the overfill detection system may stop the flow of loaded liquid product from a liquid product loading station into the tank compartment when the loaded liquid type and the transported liquid type do not match.

A tenth aspect of the present disclosure may include any one of the seventh through ninth aspects, further comprising a display electrically coupled to the system controller, wherein the computer readable and executable instructions, when executed by the processor, may further cause the system controller to indicate on the display at least one of the shipping liquid type and the transported liquid type of the liquid product in the tank compartment.

An eleventh aspect of the present disclosure may include any one of the seventh through tenth aspects, further comprising a product grade indicator (PGI) controller communicatively coupled to the system controller. The PGI controller may comprise a display. The computer readable and executable instructions, when executed by the processor, may further cause the system controller to display the shipping liquid type on the PGI controller when the shipping liquid type and the transported liquid type match and display the transported liquid type on the PGI controller when the shipping liquid type and the transported liquid type do not match.

A twelfth aspect of the present disclosure may include any one of the fifth through eleventh aspects, wherein the computer readable and executable instructions, when executed by the processor, may cause the system controller to automatically receive a signal from the fluid property sensor, a pressure sensor, or both indicative of retained liquid product present in the tank compartment and maintain the valve in the normally locked state when tank compartment contains retained liquid product as indicated by the signal.

A thirteenth aspect of the present disclosure may include any one of the first through twelfth aspects, further comprising a plurality of temperature sensors, where each of the plurality of temperature sensors may be in contact with an interior surface of one of the tank compartments.

A fourteenth aspect of the present disclosure may include the thirteenth aspect, wherein the computer readable and executable instructions, when executed by the processor, may cause the system controller to receive a temperature signal from one of the temperature sensors, the temperature signal indicative of a temperature of the liquid product in the tank compartment and transmit the temperature signal indicative of the temperature of the liquid product in the tank compartment to the loading system, the fleet management system, the cloud system, or both.

A fifteenth aspect of the present disclosure may include either one of the thirteenth or fourteenth aspects, wherein the computer readable and executable instructions, when executed by the processor, may cause the system controller to receive temperature information for each liquid product in each tank compartments from the fleet management system, cloud system, or loading system at the loading station; compare the measured temperature in each of the tank compartments to the temperature information received for each of the liquid products in the tank compartments; and control a temperature of the tank compartments based on the comparison.

A sixteenth aspect of the present disclosure may include any one of the first through fifteenth aspects, further comprising a level sensor coupled to the tank compartment and operable to transmit a level signal to the system controller indicating an amount of liquid product present in the tank compartment.

A seventeenth aspect of the present disclosure may include the sixteenth aspect, wherein the level sensor may be a pressure sensor coupled to the tank compartment, the pressure sensor transmitting a pressure signal to the system controller indicating the amount of liquid product present in the tank compartment.

An eighteenth aspect of the present disclosure may include either one of the sixteenth of seventeenth aspects, wherein the computer readable and executable instructions, when executed by the processor, may further cause the system controller to receive the level signal from the level sensor indicative of the amount of the liquid product retained in the tank compartment; determine a retained volume of liquid product retained in the tank compartment; calculate an available volume of the tank compartment from the retained volume of liquid product retained in the tank compartment and the tank compartment volume stored in the storage medium; compare the available volume of the tank compartment to the shipping volume; maintain the valve in the normally locked state based on the comparison of the shipping volume to the available volume of the tank compartment to prevent the flow of the liquid product to be loaded into the tank compartment; and transition the valve from the normally locked state to an unlocked state based on the comparison of the shipping volume to the available volume of the tank compartment, thereby permitting the flow of the liquid product to be loaded into the tank compartment.

A nineteenth aspect of the present disclosure may include any one of the first through eighteenth aspects, further comprising an electrical socket operable to communicatively couple the system controller to the loading system at the loading station. The computer readable and executable instructions, when executed by the processor, may further cause the system controller to determine that the electrical socket is coupled to the loading system at the loading station before establishing the communication path between the network interface device and the loading system.

A twentieth aspect of the present disclosure may include any one of the first through nineteenth aspects, further comprising an overfill detection system communicatively coupled to the system controller. The computer readable and executable instructions, when executed by the processor, may further cause the system controller to transmit an overfill condition to the overfill detection system, wherein the overfill detection system may prevent the flow of loaded liquid product from the loading station into the tank compartment based on the comparison of the shipping volume to the tank compartment volume.

A twenty-first aspect of the present disclosure may include any one of the first through twentieth aspects, wherein the product transport vehicle may comprise a plurality of tank compartments and a plurality of valves, individual ones of the plurality of valves being coupled to individual ones of the plurality of tank compartments and regulating a flow of liquid product into and out of the individual ones of the plurality of tank compartments and having a normally locked state.

A twenty-second aspect of the present disclosure may include the twenty-first aspect, wherein the computer readable and executable instructions, when executed by the processor, may further cause the system controller to compare the shipping volume to a tank compartment volume of each of the plurality of tank compartments, wherein the tank compartment volume for each of the plurality of tank compartments may be stored in the storage medium; maintain individual ones of the plurality of valves in the normally locked state based on the comparison of the shipping volume to the tank compartment volume in the corresponding tank compartment to prevent the flow of liquid product into the corresponding tank compartment; and transition individual ones of the plurality of valves from the normally locked state based on the comparison of the shipping volume to the tank compartment volume in the corresponding tank compartment, thereby allowing the flow of liquid product into the corresponding tank compartment.

A twenty-third aspect of the present disclosure may include any one of the first through twenty-second aspects, wherein the executable instructions, when executed by the processor, may cause the system controller to automatically determine one or more loading performance metrics for the product delivery system and transmit the one or more loading performance metrics to the loading system at the loading station, the fleet management system, the cloud system, or combinations of these. The loading performance metrics may include one or more of the following: loading setup time indicative of a time between arrival of the product transport vehicle at the loading station and a time at which fluid flow into the tank compartment is detected; a loading transition time indicative of a time elapsed during to transition from loading a first tank compartment to loading a second tank compartment; a tank compartment loading time for each tank compartment indicative of the time elapsed to complete loading of the tank compartment; or a total loading time indicative of a total time elapsed to load all of the tank compartments of the product transport vehicle.

A twenty-fourth aspect of the present disclosure may include any one of the first through twenty-third aspects, wherein the executable instructions, when executed by the processor, may cause the system controller to automatically determine one or more delivery performance metrics for the product delivery system and transmit the one or more unloading performance metrics to the fleet management system, the cloud system, or the loading system at the loading station. The delivery performance metrics may include one or more of the following: unloading setup time indicative of a time between arrival of the product transport vehicle at the distribution station and a time at which fluid flow from the tank compartment to a distribution tank at the distribution station is detected; an unloading transition time indicative of a time elapsed to transition from unloading from a first tank compartment to unloading from a second tank compartment; a tank compartment unloading time for each tank compartment indicative of the time elapsed to complete unloading of the tank compartment; a total unloading time indicative of a total time between commencing unloading of the first tank compartment to conclusion of unloading of a last tank compartment; or a total site time indicative of a total time between arrival of the product transport vehicle at the distribution station and departure of the product transport vehicle from the distribution station.

According to a twenty-fifth aspect of the present disclosure, a method for loading a liquid product into a tank compartment of a product transport vehicle may include fluidly coupling the tank compartment of the product transport vehicle to a transfer line at a loading station. The tank compartment may include a valve regulating a flow of liquid product into the tank compartment and having a normally locked state, establishing a communication path between a system controller of the product transport vehicle and a loading system at the loading station, and receiving a shipping volume from the loading system. The shipping volume may be the volume of liquid product scheduled to be loaded into the tank compartment. The method may further include comparing the shipping volume to a tank compartment volume of the tank compartment, wherein the tank compartment volume may be stored in the storage medium or determined from a signal received from a level sensor, maintaining the valve in the normally locked state based on the comparison of the shipping volume and the tank compartment volume to prevent the flow of liquid product into the tank compartment, and transitioning the valve from the normally locked state to an unlocked state based on the comparison of the shipping volume and the tank compartment volume, thereby permitting the flow of liquid product into the tank compartment.

A twenty-sixth aspect of the present disclosure may include the twenty-fifth aspect, comprising maintaining the valve in the normally locked state when the shipping volume and the tank compartment volume differ by less than a threshold amount to prevent the flow of the liquid product to be loaded into the tank compartment and transitioning the valve from the normally locked state to an unlocked state when the shipping volume and the tank compartment volume differ by more than the threshold amount thereby permitting the flow of the liquid product to be loaded into the tank compartment.

A twenty-seventh aspect of the present disclosure may include either one of the twenty-fifth or twenty-sixth aspects, further comprising receiving a fluid type signal from a fluid property sensor fluidly coupled to the tank compartment, the fluid type signal indicative of a transported liquid type of a liquid product in the tank compartment; determining the transported liquid type from the fluid type signal received from the fluid property sensor; receiving a shipping liquid type of the liquid product to be loaded in the tank compartment; comparing the shipping liquid type to the transported liquid type; maintaining the valve in the normally locked state when the shipping liquid type and the transported liquid type do not match to prevent the flow of liquid product into the tank compartment; and transitioning the valve from the normally locked state to an unlocked state when shipping liquid type and the transported liquid type match and when the shipping volume and the tank compartment volume differ by less than the threshold amount, thereby permitting the flow of liquid product into the tank compartment.

A twenty-eighth aspect of the present disclosure may include any one of the twenty-fifth through twenty-seventh aspects, further comprising sensing an amount of liquid product present in the tank compartment with a pressure sensor positioned in the tank compartment; transmitting a pressure signal to the system controller indicative of the sensed amount of liquid product present in the tank compartment; determining a retained volume of liquid product in the tank compartment from the pressure signal; calculating an available volume in the tank compartment by subtracting the retained volume from the tank compartment volume; comparing the available volume in the tank compartment to the shipping volume; maintaining the valve in the normally locked state based on the comparison of the shipping volume and the available volume in the tank compartment to prevent the flow of liquid product into the tank compartment; and transitioning the valve from the normally locked state to an unlocked state based on the comparison of the shipping volume and the available volume in the tank compartment, thereby permitting the flow of liquid product into the tank compartment.

A twenty-ninth aspect of the present disclosure may include any one of the twenty-fifth through twenty-eighth aspects, further comprising sensing an overfill condition of liquid product within the tank compartment with a point level sensor positioned in the tank compartment; and transmitting a point signal to the system controller indicating whether there is the overfill condition of liquid product within the tank compartment.

A thirtieth aspect of the present disclosure may include any one of the twenty-fifth through twenty-ninth aspects, further comprising receiving a signal from a pressure sensor, a fluid property sensor, or both indicative of retained liquid product present in the tank compartment; and maintaining the valve in the normally locked state when retained liquid product is present in the tank compartment as indicated by the signal.

According to a thirty-first aspect of the present disclosure, a product delivery system may include a product transport vehicle comprising a tank compartment for containing a liquid product. A valve may be coupled to the tank compartment, the valve regulating a flow of the liquid product into the tank compartment and having a normally locked state. A network interface device may be operable to establish a communication path with one or more external systems. A system controller may be communicatively coupled to the valve and the network interface device, the system controller comprising a processor and a storage medium containing computer readable and executable instructions which, when executed by the processor, may cause the system controller to automatically establish a communication path between the network interface device and a loading system at a loading station, a fleet management system, a cloud system, or combinations of these, and receive a shipping volume from the loading system, the fleet management system, and/or the cloud system. The shipping volume may be a volume of a liquid product scheduled to be loaded into the tank compartment. The computer readable and executable instructions, when executed by the processor, may further cause the system controller to receive a destination volume from the loading system, the fleet management system, and/or the cloud system. The destination volume may be an available volume in a distribution tank at a distribution station to which the product is to be delivered. The system controller may compare the shipping volume to the destination volume, maintain the valve in the normally locked state based on the comparison of the shipping volume to the destination volume to prevent the flow of the liquid product to be loaded into the tank compartment, and transition the valve from the normally locked state to an unlocked state based on the comparison of the shipping volume and the tank compartment volume, thereby permitting the flow of the liquid product to be loaded into the tank compartment.

A thirty-second aspect of the present disclosure is directed to a product delivery system that may comprise a product transport vehicle and a cloud system disposed at a location remote from the product transport vehicle. The cloud system may be communicatively coupled to the product transport vehicle through a network. The product transport vehicle may comprise at least one tank compartment for containing a liquid product; at least one valve coupled to the tank compartment, the valve regulating a flow of the liquid product into and out of the tank compartment and having a normally locked state; a network interface device operable to establish a communication path with one or more external systems; and a system controller communicatively coupled to the valve and the network interface device. The system controller may comprise a processor and a storage medium containing computer readable and executable instructions, when executed by the processor, cause the system controller to: receive one or more signals indicative of events, alarms, errors, or combinations of these from one or more instruments coupled to the product transport vehicle; and transmit one or more signal packets to the cloud system via the network interface device, wherein each signal packet may be indicative of one or more of the events, alarms, errors, or combinations of these indicated by the one or more signals received and each signal packet may include time stamp information, GPS information, or both for each of the events, alarms, errors, or combinations of these. The cloud system may comprise at least one cloud system processor and at least one cloud system storage medium containing cloud system computer readable and executable instructions that, when executed by the cloud system processor, may cause the cloud system to receive the one or more signal packets indicative of one or more events, alarms, errors, or combinations of these from the network interface device through the network; process the one or more signal packets; and determine a condition of the product transport vehicle based on processing the one or more signal packets.

A thirty-third aspect of the present disclosure may include the thirty-second aspect, wherein processing the one or more signal packets may comprise stitching together a plurality of events, alarms, errors, or combinations of these indicated by the one or more signal packets received by the cloud system based at least in part on the time stamp information, GPS information, or both associated with the one or more signal packets.

A thirty-fourth aspect of the present disclosure may include either one of the thirty-second of thirty-third aspects, wherein the cloud system computer readable and executable instructions, when executed by the cloud system processor, may cause the cloud system to store the events, alarms, errors, or combinations of these in an event log on the at least one cloud system storage medium.

A thirty-fifth aspect of the present disclosure may include any one of the thirty-second through thirty-fourth aspects, wherein the cloud system may comprise a user interface disposed at a remote location from the cloud system and the product transport vehicle and communicatively coupled to the cloud system through the network.

A thirty-sixth aspect of the present disclosure may include the thirty-fifth aspect, wherein the cloud system computer readable and executable instructions, when executed by the cloud system processor, may cause the cloud system to display one or more conditions of the product delivery vehicle on the user interface.

A thirty-seventh aspect of the present disclosure may include any one of the thirty-second through thirty-sixth aspects, wherein the cloud system computer readable and executable instructions, when executed by the cloud system processor, may cause the cloud system to receive temperature information for each tank compartment of the product transport vehicle and display the temperature information for each tank compartment of the product transport vehicle on a user interface.

A thirty-eighth aspect of the present disclosure may include any one of the thirty-second through thirty-seventh aspects, wherein the network interface device may comprise a network interface device processor, a GPS receiver, and at least one network interface device storage medium comprising network interface device computer readable and executable instructions that, when executed by the network interface device processor, may cause the network interface device to append each signal packet from the system controller with a time stamp and GPS information to produce the one or more signal packets and transmit the one or more signal packets to the cloud system via the network.

A thirty-ninth aspect of the present disclosure may include any one of the thirty-second through thirty-eighth aspects, wherein the cloud system computer readable and executable instructions, when executed by the cloud system processor, may cause the cloud system to receive geolocation information for one or more loading stations, distributions stations, or both from the network; and define a geofencing region for the product transport vehicle from the geolocation information received for the loading stations, distributions stations, or both. The computer readable and executable instructions, when executed by the processor, may cause the system controller to obtain the geofencing region from the cloud system; compare a GPS location of the product transport vehicle with the geofencing region; maintain the at least one valve in the normally locked state based on the comparison of the GPS location of the product transport vehicle to the geofencing region to prevent the flow of the liquid product into or out of the at least one tank compartment when the product transport vehicle is outside of the geofencing region.

A fortieth aspect of the present disclosure may include the thirty-ninth aspect, wherein the computer readable and executable instructions, when executed by the processor, may cause the system controller to allow the at least one valve to transition from the normally locked state to the unlocked state when all other preconditions are satisfied and the product delivery vehicle is located within the geofencing region.

Additional features and advantages of the embodiments described herein will be set forth in the detailed description, which follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
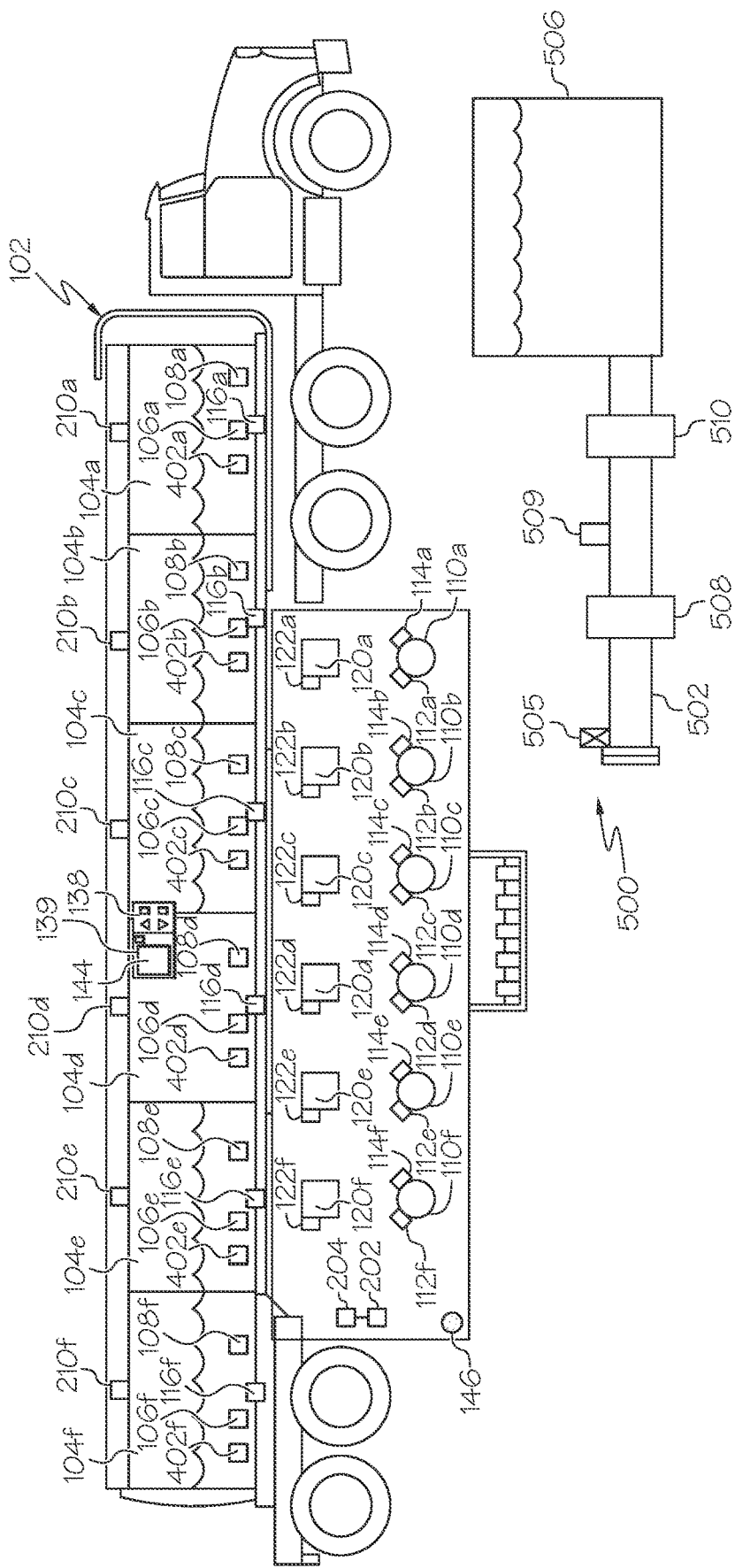
FIG. 1 schematically depicts a product delivery system that includes a product transport vehicle, according to one or more embodiments shown and described herein.

Reference will now be made in detail to embodiments of product delivery systems and methods of operating the same, examples of which are illustrated in the accompanying drawings. Whenever possible, the same reference numerals will be used throughout the drawings to refer to the same or like parts. Current liquid product loading and transportation systems rely on an operator to load the correct amount of liquid product from a loading station to one or more tank compartments of a product transport vehicle. The operator must not only ensure the correct hoses are connected to the correct tanks, but must also be aware of the available volume in each tank compartment of the product transport vehicle to avoid overfilling or under-filling the tank compartment. Overfilling of a tank compartment of the product transport vehicle may lead to a spill of the product, and depending on what is being put into the tank compartment, this could be environmentally harmful or dangerous from a chemical/combustion standpoint. If a tank compartment is under-filled because the tank compartment volume is greater than the amount of liquid product to be transported, utilization of the product transport vehicle and efficiency of the product delivery process can be diminished. The probability of overfilling the tank compartment may be further complicated by the presence of retained liquid product in the tank compartment. Retained liquid product may refer to liquid product remaining in a tank compartment following a delivery of the liquid product and may reduce the available volume of the tank compartment.

Overfill system are commercially available for detecting potential overfill conditions (e.g. , high-level sensors) and stopping loading operations before the tank compartment is overfilled. These commercially available overfill systems often depend on a physical detection device within the tank of the vehicle to detect a high-level condition of the liquid product in the tank compartment. Thus, the commercially-available overfill systems react to a high-level condition after the liquid product has already been loaded into the tank compartment. However, the problem with these commercially available overfill systems is that these systems only react to an overfill situation, and do not anticipate an overfill situation occurring. Because of this, a high-level cut-off point, which may be chosen for safety, may stop the loading short of the amount scheduled to be transported. This may lead to a discrepancy between the amount loaded and the amount intended to be transported. Failure to reconcile the discrepancy at the time of loading may result in errors record keeping, billing errors, and customer complaints. The commercially available overfill systems also do not provide information or advance notice of whether or not the entire available volume of the tank compartment will be utilized. Additionally, commercially available overfill system do not take into account the available volumes at the distribution tanks to improve utilization of the product transport vehicle.

Other problems that may arise during loading may include cross-contamination of liquid products in the tank compartments, which may result from specifying the wrong liquid product loaded, connecting the wrong tank compartment of the product transport vehicle to the loading station, or failing to recognize retained liquid products in a tank compartment that might be incompatible with the liquid product being loaded.

The product delivery systems of the present disclosure may be operable to communicate with a loading system at the loading station, a fleet management system, and/or a cloud system to determine the volume to be shipped and/or the available volume at the distribution stations and compare these volumes to the available volumes of the tank compartments of the product transport vehicle. Comparing the amount of liquid product to be shipped with the available volume in the distribution tanks and the available volumes of the tank compartments of the product transport vehicle may enable the product delivery system to predict volume mismatches and prevent loading of the liquid product from commencing until the mismatch is resolved, which may reduce or prevent overfill conditions, reduce recordkeeping errors, and improve product transport vehicle utilization, among other benefits.

The product delivery systems disclosed herein may include a product transport vehicle including a tank compartment for containing a liquid product. A valve is coupled to the tank compartment for regulating a flow of the liquid product into the tank compartment. For safety reasons, the valve has a normally locked state A network interface device is operable to establish a communication path with one or more external systems, and a system controller is communicatively coupled to the valve and the network interface device. The system controller may include a processor and a storage medium containing computer readable and executable instructions which, when executed by the processor, can cause the system controller to automatically establish a communication path between the network interface device and a loading system at a loading station, a fleet management system, a cloud system, or combinations of these. Once the communication path is established, the system controller can receive a shipping volume from the loading system, the fleet management system, and/or the cloud system, where the shipping volume is a volume of a liquid product scheduled to be loaded into the tank compartment. The system controller also can compare the shipping volume to a tank compartment volume of the tank compartment, where the tank compartment volume is stored in the storage medium. The system controller can compare the available volume in the tank compartment against the amount to be shipped from the loading station, the fleet management system, and/or the cloud system and can allow or disallow loading based on the comparison. The system controller can maintain the valve in the normally locked state based on the comparison of the shipping volume and the tank compartment volume to prevent the flow of the liquid product to be loaded into the tank compartment. Once all the information is received by the system controller, the system controller can transition the control valve or internal valve from the normally locked state to an unlocked state based on the comparison of the shipping volume and the tank compartment volume, thereby permitting the flow of the liquid product to be loaded into the tank compartment.

Referring now to FIG. 1, the product delivery system 100 includes a product transport vehicle 102 (e.g., a fuel truck) operable to receive a liquid product (e.g., gasoline or diesel fuel) at a loading station and deliver the liquid product to a distribution tank (e.g., an underground distribution tank containing gasoline or an underground distribution tank containing diesel fuel) at a distribution facility (e.g., a consumer gas station). The product delivery system 100 can include various components and aspects of the product delivery systems, such as those described in U.S. Pat. No. 9,823,665, Nov. 21, 2017, entitled "Cross Contamination Control Systems with Fluid Product ID Sensors," the entire contents of which are incorporated by reference herein in their entirety. The product transport vehicle 102 may include one or a plurality of tank compartments, such as tank compartments 104a, ..., 104f, one or a plurality of control valves, such as control valves 110a, ..., 110f, one or a plurality of control valve sensors 112a, ..., 112f, one or a plurality of hose tag readers 114a, ..., 114f, one or a plurality of internal valves, such as internal valves 116a, ..., 116f, one or a plurality of solenoid valves 120a, ..., 120f, one or a plurality of solenoid valve sensors 122a, ..., 122f, a main air input connection 202, a main air valve 204, user input device 138, a magnet 139, and a display 144. The product transport vehicle 102 may include one or a plurality of fluid property sensors, such as fluid property sensors 106a, ..., 106f, one or a plurality of pressure sensors, such as pressure sensors 108a, ..., 108f, one or a plurality of overfill sensors, such as overfill sensors 210a, ..., 210f, and/or one or a plurality of temperature sensors, such as temperature sensors 402a, ..., 402f. The various components and relationships thereof of the product transport vehicle 102 will now be described.

Still referring to the product transport vehicle 102 of FIG. 1, the tank compartments 104a, ..., 104f may include a first tank compartment 104a, a second tank compartment 104b, a third tank compartment 104c, a fourth tank compartment 104d, a fifth tank compartment 104e, and a sixth tank compartment 104f. In other embodiments, the product transport vehicle 102 may include greater than or less than six tank compartments. Each of the tank compartments may operable to receive and contain a liquid product, such as a particular type of fuel, to be delivered to the distribution tanks 170a, 170b at the distribution facility.

Still referring to FIG. 1, the fluid property sensors (FPS) 106a, ..., 106f may include one or more of a first fluid property sensor 106a, a second fluid property sensor 106b, a third fluid property sensor 106c, a fourth fluid property sensor 106d, a fifth fluid property sensor 106e, and/or a sixth fluid property sensor 106f. The first fluid property sensor 106a may be associated with the first tank compartment 104a. The first fluid property sensor 106a may be positioned to contact fluid contained within the first tank compartment 104a and to output a signal indicative of a sensed fluid property (e.g., viscosity, density, dielectric constant, transmissivity, fluorescence, temperature, etc.) of the fluid contained within the first tank compartment 104a. In embodiments, the first fluid property sensor 106a may be positioned in the first tank compartment 104a. In embodiments, the first fluid property sensor 106a may be positioned in a pipe or conduit fluidly coupled to the first tank compartment 104a, such as a pipe fluidly coupled to a bottom of the first tank compartment 104a.

The second fluid property sensor 106b may be associated with the second tank compartment 104b. The second fluid property sensor 106b may be positioned to contact fluid contained within the second tank compartment 104b and to output a signal indicative of a sensed fluid property (e.g., viscosity, density, dielectric constant, transmissivity, fluorescence, temperature, etc.) of the fluid contained within the second tank compartment 104b. In embodiments, the second fluid property sensor 106b may be positioned in the second tank compartment 104b. In embodiments, the second fluid property sensor 106b may be positioned in a pipe or conduit fluidly coupled to the second tank compartment 104b, such as a pipe fluidly coupled to a bottom of the second tank compartment 104b.

The third fluid property sensor 106c may be associated with the third tank compartment 104c. The third fluid property sensor 106c may be positioned to contact fluid contained within the third tank compartment 104c and to output a signal indicative of a sensed fluid property (e.g., viscosity, density, dielectric constant, transmissivity, fluorescence, temperature, etc.) of the fluid contained within the third tank compartment 104c. In embodiments, the third fluid property sensor 106c may be positioned in the third tank compartment 104c. In embodiments, the third fluid property sensor 106c may be positioned in a pipe or conduit fluidly coupled to the third tank compartment 104c, such as a pipe fluidly coupled to a bottom of the third tank compartment 104c.

The fourth fluid property sensor 106d may be associated with the fourth tank compartment 104d. The fourth fluid property sensor 106d may be positioned to contact fluid contained within the fourth tank compartment 104d and to output a signal indicative of a sensed fluid property (e.g., viscosity, density, dielectric constant, transmissivity, fluorescence, temperature, etc.) of the fluid contained within the fourth tank compartment 104d. In embodiments, the fourth fluid property sensor 106d may be positioned in the fourth tank compartment 104d. In embodiments, the fourth fluid property sensor 106d may be positioned in a pipe or conduit fluidly coupled to the fourth tank compartment 104d, such as a pipe fluidly coupled to a bottom of the fourth tank compartment 104d.

The fifth fluid property sensor 106e may be associated with the fifth tank compartment 104e. The fifth fluid property sensor 106e may be positioned to contact fluid contained within the fifth tank compartment 104e and to output a signal indicative of a sensed fluid property (e.g., viscosity, density, dielectric constant, transmissivity, fluorescence, temperature, etc.) of the fluid contained within the fifth tank compartment 104e. In embodiments, the fifth fluid property sensor 106e may be positioned in the fifth tank compartment 104e. In embodiments, the fifth fluid property sensor 106e may be positioned in a pipe or conduit fluidly coupled to the fifth tank compartment 104e, such as a pipe fluidly coupled to a bottom of the fifth tank compartment 104e.

The sixth fluid property sensor 106f may be associated with the sixth tank compartment 104f. The sixth fluid property sensor 106f may be positioned to contact fluid contained within the sixth tank compartment 104f and to output a signal indicative of a sensed fluid property (e.g., viscosity, density, dielectric constant, transmissivity, fluorescence, temperature, etc.) of the fluid contained within the sixth tank compartment 104f. In embodiments, the sixth fluid property sensor 106f may be positioned in the sixth tank compartment 104f. In embodiments, the sixth fluid property sensor 106f may be positioned in a pipe or conduit fluidly coupled to the sixth tank compartment 104f, such as a pipe fluidly coupled to a bottom of the sixth tank compartment 104f.

In embodiments, one or more of the plurality of fluid property sensors 106a, . . . , 106f may be a fluid property sensor as described in U.S. Pat. No. 9,823,665, Nov. 21, 2017, entitled "Cross Contamination Control Systems with Fluid Product ID Sensors," the entirety of which is incorporated herein by reference. In embodiments, one or more of the plurality of fluid property sensors 106a, . . . , 106f is a tuning fork sensor model number FPS2800612C4 by Measurement Specialties. In other embodiments, one or more than one of the fluid property sensors 106a, . . . , 106f may be an optical fluid sensor as described in U.S. patent application Ser. No. 15/291,178, filed Oct. 12, 2016, entitled "Optical Fluid Sensors for Cross Contamination Control Systems," the entirety of which is incorporated herein by reference. However, it should be understood that other alternative fluid property sensors capable of determining the type of fluid in the tank compartments 104a, . . . , 104f could be used.

Still referring to FIG. 1, the pressure sensors 108a, . . . , 108f may include one or more of a first pressure sensor 108a, a second pressure sensor 108b, a third pressure sensor 108c, a fourth pressure sensor 108d, a fifth pressure sensor 108e, and/or a sixth pressure sensor 108f. The first pressure sensor 108a may be associated with the first tank compartment 104a. The first pressure sensor 108a may output a signal indicative of a sensed pressure within the first tank compartment 104a, which may be utilized to gauge the approximate level or amount of liquid in the first tank compartment 104a. In embodiments, the first pressure sensor 108a may be positioned in the first tank compartment 104a. In embodiments, the first pressure sensor 108a may be positioned in a pipe or conduit fluidly coupled to the first tank compartment 104a, such as a pipe fluidly coupled to a bottom of the first tank compartment 104a.

The second pressure sensor 108b may be associated with the second tank compartment 104b. The second pressure sensor 108b may output a signal indicative of a sensed pressure within the second tank compartment 104b, which may be utilized to gauge the approximate level or amount of liquid in the second tank compartment 104b. In embodiments, the second pressure sensor 108b may be positioned in the second tank compartment 104b. In embodiments, the second pressure sensor 108b may be positioned in a pipe or conduit fluidly coupled to the second tank compartment 104b, such as a pipe fluidly coupled to a bottom of the second tank compartment 104b.

The third pressure sensor 108c may be associated with the third tank compartment 104c. The third pressure sensor 108c may output a signal indicative of a sensed pressure within the third tank compartment 104c, which may be utilized to gauge the approximate level or amount of liquid in the third tank compartment 104c. In embodiments, the third pressure sensor 108c may be positioned in the third tank compartment 104c. In embodiments, the third pressure sensor 108c may be positioned in a pipe or conduit fluidly coupled to the third tank compartment 104c, such as a pipe fluidly coupled to a bottom of the third tank compartment 104c.

The fourth pressure sensor 108d may be associated with the fourth tank compartment 104d. The fourth pressure sensor 108d may output a signal indicative of a sensed pressure within the fourth tank compartment 104d, which may be utilized to gauge the approximate level or amount of liquid in the fourth tank compartment 104d. In embodiments, the fourth pressure sensor 108d may be positioned in the fourth tank compartment 104d. In embodiments, the fourth pressure sensor 108d may be positioned in a pipe or conduit fluidly coupled to the fourth tank compartment 104d, such as a pipe fluidly coupled to a bottom of the fourth tank compartment 104d.

The fifth pressure sensor 108e may be associated with the fifth tank compartment 104e. The fifth pressure sensor 108e may output a signal indicative of a sensed pressure within the fifth tank compartment 104e, which may be utilized to gauge the approximate level or amount of liquid in the fifth tank compartment 104e. In embodiments, the fifth pressure sensor 108e may be positioned in the fifth tank compartment 104e. In embodiments, the fifth pressure sensor 108e may be positioned in a pipe or conduit fluidly coupled to the fifth tank compartment 104e, such as a pipe fluidly coupled to a bottom of the fifth tank compartment 104e.

The sixth pressure sensor 108f may be associated with the sixth tank compartment 104f. The sixth pressure sensor 108f may output a signal indicative of a sensed pressure within the sixth tank compartment 104f, which may be utilized to gauge the approximate level or amount of liquid in the sixth tank compartment 104f. In embodiments, the sixth pressure sensor 108f may be positioned in the sixth tank compartment 104f. In embodiments, the sixth pressure sensor 108f may be positioned in a pipe or conduit fluidly coupled to the sixth tank compartment 104f, such as a pipe fluidly coupled to a bottom of the sixth tank compartment 104f.

In embodiments, one or more of the plurality of pressure sensors 108a, . . . , 108f may be a pressure sensor as described in U.S. Pat. No. 9,823,665, previously cited in this disclosure. In embodiments, one or more of the plurality of pressure sensors 108a, . . . , 108f may be a diaphragm pressure sensor, model number 1E/F by Televac. However, it should be understood that alternative pressure sensors may be used, such as, for example, a piezo pressure sensor or an electric pressure sensor.

Still referring to FIG. 1, the overfill sensors 210a, . . . , 210f may include one or more of a first overfill sensor 210a, a second overfill sensor 210b, a third overfill sensor 210c, a fourth overfill sensor 210d, a fifth overfill sensor 210e, and/or a sixth overfill sensor 210f. The first overfill sensor 210a may be associated with the first tank compartment 104a. The first overfill sensor 210a may be operable to determine an overfill condition in the first tank compartment 104a. The first overfill sensor 210a may output or transmit a signal indicative of an overfill condition within the first tank compartment 104a. In embodiments, the first overfill sensor 210a may be operable to determine a liquid level in the first tank compartment 104a and output or transmit a signal indicative of the liquid level of fluid in the first tank compartment 104a. In embodiments, the first overfill sensor 210a may be positioned in a top portion of the first tank compartment 104a.

The second overfill sensor 210b may be associated with the second tank compartment 104b. The second overfill sensor 210b may be operable to determine an overfill condition in the second tank compartment 104b. The second overfill sensor 210b may output or transmit a signal indicative of an overfill condition within the second tank compartment 104b. In embodiments, the second overfill sensor 210b may be operable to determine a liquid level in the second tank compartment 104b and output or transmit a signal indicative of the liquid level of fluid in the second tank compartment 104b. In embodiments, the second overfill sensor 210b may be positioned in a top portion of the second tank compartment 104b.

The third overfill sensor 210c may be associated with the third tank compartment 104c. The third overfill sensor 210c may be operable to determine an overfill condition in the third tank compartment 104c. The third overfill sensor 210c may output or transmit a signal indicative of an overfill condition within the third tank compartment 104c. In embodiments, the third overfill sensor 210c may be operable to determine a liquid level in the third tank compartment 104c and output or transmit a signal indicative of the liquid level of fluid in the third tank compartment 104c. In embodiments, the third overfill sensor 210c may be positioned in a top portion of the third tank compartment 104c.

The fourth overfill sensor 210d may be associated with the fourth tank compartment 104d. The fourth overfill sensor 210d may be operable to determine an overfill condition in the fourth tank compartment 104d. The fourth overfill sensor 210d may output or transmit a signal indicative of an overfill condition within the fourth tank compartment 104d. In embodiments, the fourth overfill sensor 210d may be operable to determine a liquid level in the fourth tank compartment 104d and output or transmit a signal indicative of the liquid level of fluid in the fourth tank compartment 104d. In embodiments, the fourth overfill sensor 210d may be positioned in a top portion of the fourth tank compartment 104d.

The fifth overfill sensor 210e may be associated with the fifth tank compartment 104e. The fifth overfill sensor 210e may be operable to determine an overfill condition in the fifth tank compartment 104e. The fifth overfill sensor 210e may output or transmit a signal indicative of an overfill condition within the fifth tank compartment 104e. In embodiments, the fifth overfill sensor 210e may be operable to determine a liquid level in the fifth tank compartment 104e and output or transmit a signal indicative of the liquid level of fluid in the fifth tank compartment 104e. In embodiments, the fifth overfill sensor 210e may be positioned in a top portion of the fifth tank compartment 104e.

The sixth overfill sensor 210f may be associated with the sixth tank compartment 104f. The sixth overfill sensor 210f may be operable to determine an overfill condition in the sixth tank compartment 104f. The sixth overfill sensor 210f may output or transmit a signal indicative of an overfill condition within the sixth tank compartment 104f. In embodiments, the sixth overfill sensor 210f may be operable to determine a liquid level in the sixth tank compartment 104f and output or transmit a signal indicative of the liquid level of fluid in the sixth tank compartment 104f. In embodiments, the sixth overfill sensor 210f may be positioned in a top portion of the sixth tank compartment 104f.

In embodiments, one or more of the plurality of overfill sensors 210a, . . . , 210f may be an overfill probe as described in U.S. Pat. No. 8,593,290, Nov. 26, 2016, entitled "Overfill Detection System for Tank Trucks," the entirety of which is incorporated herein by reference. However, it should be understood that other alternative overfill sensors may be used. In embodiments, one or more of the plurality of overfill sensors 210a, . . . , 210f may be a level probe, such as point level probe or a continuous level probe. Examples of level probes may include, but are not limited to, ultrasonic, optical, microwave, capacitance, nuclear, or mechanical level probes, or other types of level probe.

Still referring to FIG. 1, the temperature sensors 402a, . . . , 402f may include one or more of a first temperature sensor 402a, a second temperature sensor 402b, a third temperature sensor 402c, a fourth temperature sensor 402d, a fifth temperature sensor 402e, and a sixth temperature sensor 402f. The first temperature sensor 402a may be associated with the first tank compartment 104a. The first temperature sensor 402a may be positioned to contact fluid contained within the first tank compartment 104a and to output a signal indicative of a sensed temperature of the fluid contained within the first tank compartment 104a. In embodiments, the first temperature sensor 402a may be positioned in the first tank compartment 104a. In embodiments, the first temperature sensor 402a may be positioned in a pipe or conduit fluidly coupled to the first tank compartment 104a, such as a pipe fluidly coupled to a bottom of the first tank compartment 104a. In embodiments, the first temperature sensor 402a may include a plurality of temperature sensors.

The second temperature sensor 402b may be associated with the second tank compartment 104b. The second temperature sensor 402b may be positioned to contact fluid contained within the second tank compartment 104b and to output a signal indicative of a sensed temperature of the fluid contained within the second tank compartment 104b. In embodiments, the second temperature sensor 402b may be positioned in the second tank compartment 104b. In embodiments, the second temperature sensor 402b may be positioned in a pipe or conduit fluidly coupled to the second tank compartment 104b, such as a pipe fluidly coupled to a bottom of the second tank compartment 104b. In embodiments, the second temperature sensor 402b may include a plurality of temperature sensors.

The third temperature sensor 402c may be associated with the third tank compartment 104c. The third temperature sensor 402c may be positioned to contact fluid contained within the third tank compartment 104c and to output a signal indicative of a sensed temperature of the fluid contained within the third tank compartment 104c. In embodiments, the third temperature sensor 402c may be positioned in the third tank compartment 104c. In embodiments, the third temperature sensor 402c may be positioned in a pipe or conduit fluidly coupled to the third tank compartment 104c, such as a pipe fluidly coupled to a bottom of the third tank compartment 104c. In embodiments, the third temperature sensor 402c may include a plurality of temperature sensors.

The fourth temperature sensor 402d may be associated with the fourth tank compartment 104d. The fourth temperature sensor 402d may be positioned to contact fluid contained within the fourth tank compartment 104d and to output a signal indicative of a sensed temperature of the fluid contained within the fourth tank compartment 104d. In embodiments, the fourth temperature sensor 402d may be positioned in the fourth tank compartment 104d. In embodiments, the fourth temperature sensor 402d may be positioned in a pipe or conduit fluidly coupled to the fourth tank compartment 104d, such as a pipe fluidly coupled to a bottom of the fourth tank compartment 104d. In embodiments, the fourth temperature sensor 402d may include a plurality of temperature sensors.

The fifth temperature sensor 402e may be associated with the fifth tank compartment 104e. The fifth temperature sensor 402e may be positioned to contact fluid contained within the fifth tank compartment 104e and to output a signal indicative of a sensed temperature of the fluid contained within the fifth tank compartment 104e. In embodiments, the fifth temperature sensor 402e may be positioned in the fifth tank compartment 104e. In embodiments, the fifth temperature sensor 402e may be positioned in a pipe or conduit fluidly coupled to the fifth tank compartment 104e, such as a pipe fluidly coupled to a bottom of the fifth tank compartment 104e. In embodiments, the fifth temperature sensor 402e may include a plurality of temperature sensors.

The sixth temperature sensor 402f may be associated with the sixth tank compartment 104f. The sixth temperature sensor 402f may be positioned to contact fluid contained within the sixth tank compartment 104f and to output a signal indicative of a sensed temperature of the fluid contained within the sixth tank compartment 104f. In embodiments, the sixth temperature sensor 402f may be positioned in the sixth tank compartment 104f. In embodiments, the sixth temperature sensor 402f may be positioned in a pipe or conduit fluidly coupled to the sixth tank compartment 104f, such as a pipe fluidly coupled to a bottom of the sixth tank compartment 104f. In embodiments, the sixth temperature sensor 402f may include a plurality of temperature sensors.

In embodiments, one or more of the plurality of temperature sensors 402a, . . . , 402f may be part of a temperature monitoring and control system operable to monitor and control the temperature in each of the plurality of tank compartments 104a, . . . , 104f. Temperature monitoring and control systems are described in U.S. Pat. No. 9,715,241, Jul. 25, 2017, entitled "Temperature Monitoring and Control Apparatus and Method," the entirety of which is incorporated herein by reference.

Figure 2:
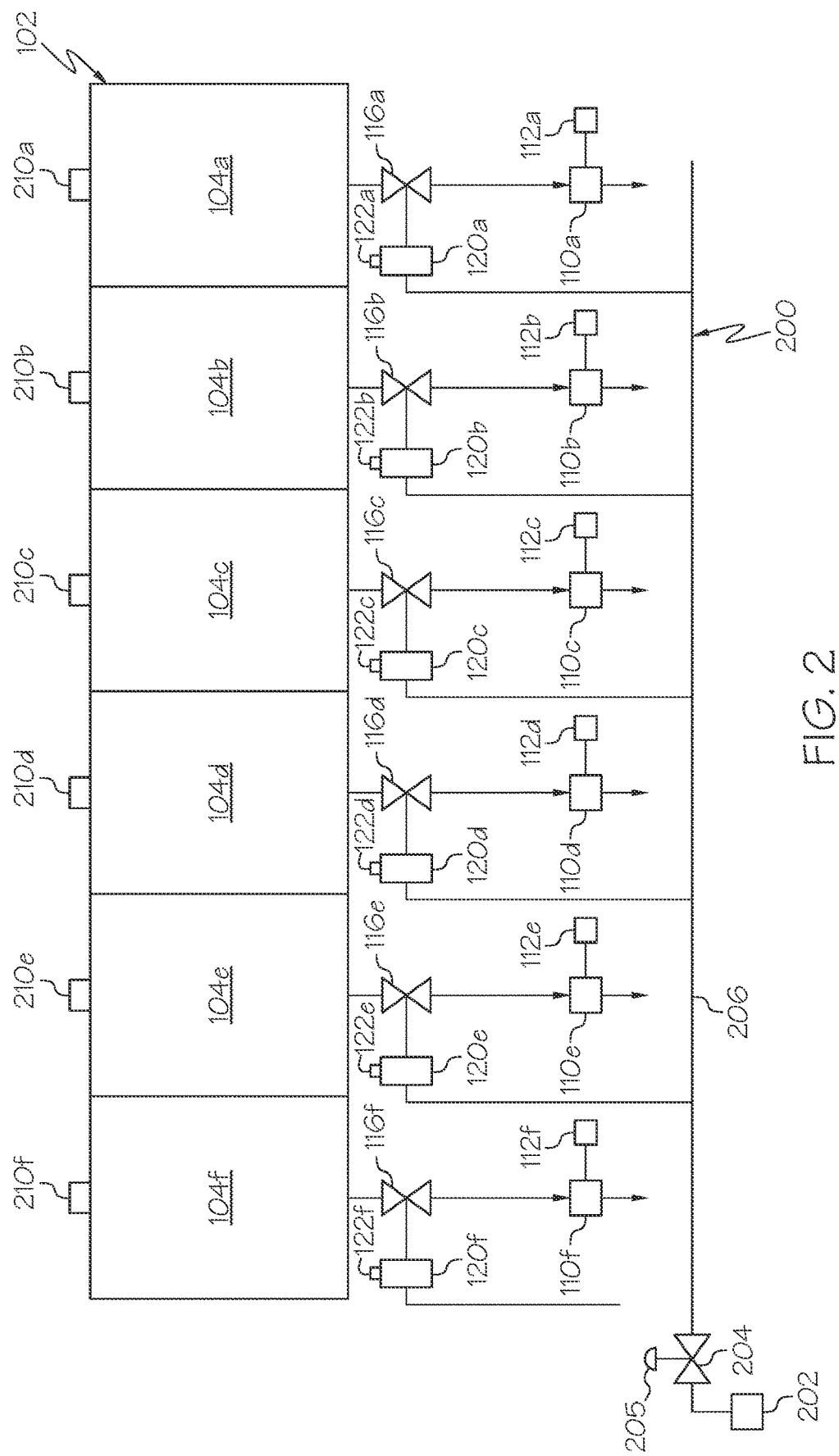
FIG. 2 schematically depicts an air system of the product transport vehicle of FIG. 1, according to one or more embodiments shown and described herein.

Still referring to FIGS. 1 and 2, the internal valves 116a, . . . , 116f may include one or more of a first internal valve 116a, a second internal valve 116b, a third internal valve 116c, a fourth internal valve 116d, a fifth internal valve 116e, and/or a sixth internal valve 116f. The first internal valve 116a may be fluidly coupled to the first tank compartment 104a and may control the release of fluid, such as a liquid product, from the first tank compartment 104a. For example, the fluid may be released from the first tank compartment 104a when the first internal valve 116a is in an open configuration, and fluid may not be released from the first tank compartment 104a when the first internal valve 116a is in a closed configuration. In embodiments, the first internal valve 116a may have a normally closed configuration. In embodiments, the first internal valve 116a may be an air operated valve and may be operatively coupled to an air system 200 (FIG. 2) of the product transport vehicle 102. In embodiments, the first internal valve 116a may be an emergency valve.

Referring again to FIG. 1, the second internal valve 116b may be fluidly coupled to the second tank compartment 104b and may control the release of fluid, such as a liquid product, from the second tank compartment 104b. For example, the fluid may be released from the second tank compartment 104b when the second internal valve 116b is in an open configuration, and fluid may not be released from the second tank compartment 104b when the second internal valve 116b is in a closed configuration. In embodiments, the second internal valve 116b may have a normally closed configuration. In embodiments, the second internal valve 116b may be an air-operated valve and may be operatively coupled to the air system of the product transport vehicle 102. In embodiments, the second internal valve 116b may be an emergency valve.

The third internal valve 116c may be fluidly coupled to the third tank compartment 104c and may control the release of fluid, such as a liquid product, from the third tank compartment 104c. For example, the fluid may be released from the third tank compartment 104c when the third internal valve 116c is in an open configuration, and fluid may not be released from the third tank compartment 104c when the third internal valve 116c is in a closed configuration. In embodiments, the third internal valve 116c may have a normally closed configuration. In embodiments, the third internal valve 116c may be an air-operated valve and may be operatively coupled to the air system of the product transport vehicle 102. In embodiments, the third internal valve 116c may be an emergency valve.

The fourth internal valve 116d may be fluidly coupled to the fourth tank compartment 104d and may control the release of fluid, such as a liquid product, from the fourth tank compartment 104d. For example, the fluid may be released from the fourth tank compartment 104d when the fourth internal valve 116d is in an open configuration, and fluid may not be released from the fourth tank compartment 104d when the fourth internal valve 116d is in a closed configuration. In embodiments, the fourth internal valve 116d may have a normally closed configuration. In embodiments, the fourth internal valve 116d may be an air operated valve and may be operatively coupled to the air system of the product transport vehicle 102. In embodiments, the fourth internal valve 116d may be an emergency valve.

The fifth internal valve 116e may be fluidly coupled to the fifth tank compartment 104e and may control the release of fluid, such as a liquid product, from the fifth tank compartment 104e. For example, the fluid may be released from the fifth tank compartment 104e when the fifth internal valve 116e is in an open configuration, and fluid may not be released from the fifth tank compartment 104e when the fifth internal valve 116e is in a closed configuration. In embodiments, the fifth internal valve 116e may have a normally closed configuration. In embodiments, the fifth internal valve 116e may be an air-operated valve and may be operatively coupled to the air system of the product transport vehicle 102. In embodiments, the fifth internal valve 116e may be an emergency valve.

The sixth internal valve 116f may be fluidly coupled to the sixth tank compartment 104f and may control the release of fluid, such as a liquid product, from the sixth tank compartment 104f. For example, the fluid may be released from the sixth tank compartment 104f when the sixth internal valve 116f is in an open configuration, and fluid may not be released from the sixth tank compartment 104f when the sixth internal valve 116f is in a closed configuration. In embodiments, the sixth internal valve 116f may have a normally closed configuration. In embodiments, the sixth internal valve 116f may be an air-operated valve and may be operatively coupled to the air system of the product transport vehicle 102. In embodiments, the sixth internal valve 116f may be an emergency valve.

Referring to FIG. 2, the air system 200 of the product transport vehicle 102 may include a main air inlet connection 202, a main air valve 204, a manifold 206 fluidly coupled to the main air valve 204, and the one or a plurality of solenoid valves 120a, ..., 120f fluidly coupled to the manifold 206. The main air inlet connection 202 may be couplable to a compressed gas source, such as a source of compressed air or other compressed gases. Other compressed gases may include but are not limited to carbon dioxide, nitrogen, argon, inert gases, non-combustible gases, or combinations of gases. The main air valve 204 may be in fluid communication with the main air inlet connection 202. In embodiments, the main air valve 204 may include an actuator 205 operative to transition the main air valve 204 between a closed configuration and an open configuration. In embodiments, the main air valve 204 may have a normally closed configuration such that activation of the actuator 205 transitions the main air valve 204 from the closed configuration to the open configuration and deactivation of the actuator 205 transitions the main air valve 204 from the open configuration back to the closed configuration.

The manifold 206 may include a rigid or flexible conduit in fluid communication with the main air valve 204. The manifold 206 may include a plurality of connections from which the manifold 206 may supply the compressed gas to one or a plurality of devices or systems associated with the product transport vehicle 102. For example, in embodiments, each of the connections of the manifold 206 may be fluidly coupled to one of the plurality of solenoid valves 120a, ..., 120f to supply the compressed air to the solenoid valve 120a, ..., 120f.

Still referring to FIG. 2, the plurality of solenoid valves 120a, ..., 120f may include one or more of a first solenoid valve 120a, a second solenoid valve 120b, a third solenoid valve 120c, a fourth solenoid valve 120d, a fifth solenoid valve 120e, and/or a sixth solenoid valve 120f. In embodiments, each of the plurality of solenoid valves 120a, ..., 120f may be a pneumatic solenoid valve operable to actuate one of the plurality of internal valves 116a, ..., 116f associated with a corresponding tank compartment 104a, ..., 104f. In embodiments, each of the plurality of solenoid valves 120a, ..., 120f may be fluidly coupled to the manifold 206 for providing the compressed air to the solenoid valves 120a, ..., 120f.

Each of the solenoid valves 120a, ..., 120f may be associated with one of the tank compartments 104a, ..., 104f and may control the actuation of the internal valves 116a, ..., 116f associated with the tank compartments 104a, ..., 104f. The solenoid valves 120a, ..., 120f may actuate the internal valve 116a, ..., 116f between the closed configuration and the open configuration of the internal valves 116a, ..., 116f. In embodiments, the solenoid valves 120a, ..., 120f may have a normally closed configuration in which no compressed air is supplied to the internal valves 116a, ..., 116f when no control signal is provided to the solenoid valves 120a, ..., 120f. The solenoid valves 120a, ..., 120f may include solenoid valve sensors 122a, ..., 122f positioned proximate to the solenoid valves 120a, ..., 120f, respectively. Each of the solenoid valve sensors 122a, ..., 122f may be operable to output a signal indicative of a position or configuration of the solenoid valve 120a, ..., 120f to which the solenoid valve sensor is coupled, such as a signal indicative of the solenoid valve 120a, ..., 120f being in an open configuration or a closed configuration. In embodiments, one or more of the plurality of solenoid valves 120a, ..., 120f may be a solenoid valve or solenoid valve assembly as described in U.S. Pat. No. 9,823,665, previously cited in this disclosure, though embodiments are not limited thereto.

Still referring to FIG. 2, the control valves 110a, ..., 110f may include one or more of a first control valve 110a, a second control valve 110b, a third control valve 110c, a fourth control valve 110d, a fifth control valve 110e, and/or a sixth control valve 110f. The first control valve 110a may be fluidly coupled to the first internal valve 116a, which may be fluidly coupled to the first tank compartment 104a. The first control valve 110a may control the release of fluid from the first tank compartment 104a, such that fluid may be released from the first tank compartment 104a when the first control valve 110a and the first internal valve 116a are in an open configuration and fluid may not be released from the first tank compartment 104a when the first control valve 110a is in a closed configuration. When the first internal valve 116a and the first control valve 110a are both in the open configuration, then the liquid product in the first tank compartment 104a may flow out of the first tank compartment 104a, through the first internal valve 116a, and then through the first control valve 110a. A first control valve sensor 112a may be positioned proximate to the first control valve 110a. The first control valve sensor 112a may output a signal indicative of a position or configuration of the first control valve 110a, such as a signal indicative of the first control valve 110a being in the open configuration or the closed configuration. The first control valve 110a and first internal valve 116a may be opened and closed manually by an operator or automatically (e.g. , when the first control valve 110a and first internal valve 116a are actuated by an electronic, pneumatic, magnetic, or electro-mechanical actuator).

The second control valve 110b may be fluidly coupled to the second internal valve 116b, which may be fluidly coupled to the second tank compartment 104b. The second control valve 110b may control the release of fluid from the second tank compartment 104b, such that fluid may be released from the second tank compartment 104b when the second control valve 110b and the second internal valve 116b are in an open configuration and fluid may not be released from the second tank compartment 104b when the second control valve 110b is in a closed configuration. When the second internal valve 116b and the second control valve 110b are both in the open configuration, then the liquid product in the second tank compartment 104b may flow out of the second tank compartment 104b, through the second internal valve 116a, and then through the second control valve 110b. A second control valve sensor 112b may be positioned proximate to the second control valve 110b. The second control valve sensor 112b may output a signal indicative of a position or configuration of the second control valve 110b, such as a signal indicative of the second control valve 110b being in the open configuration or the closed configuration. The second control valve 110b and second internal valve 116b may be opened and closed manually by an operator or automatically (e.g. , when the second control valve 110b and second internal valve 116b are actuated by an electronic, pneumatic, magnetic, or electro-mechanical actuator).

The third control valve 110c may be fluidly coupled to the third internal valve 116c, which may be fluidly coupled to the third tank compartment 104c. The third control valve 110c may control the release of fluid from the third tank compartment 104c, such that fluid may be released from the third tank compartment 104c when the third control valve 110c and the third internal valve 116c are in an open configuration and fluid may not be released from the third tank compartment 104c when the third control valve 110c is in a closed configuration. When the third internal valve 116c and the third control valve 110c are both in the open configuration, then the liquid product in the third tank compartment 104c may flow out of the third tank compartment 104c, through the third internal valve 116c, and then through the third control valve 110c. A third control valve sensor 112c may be positioned proximate to the third control valve 110c. The third control valve sensor 112c may output a signal indicative of a position or configuration of the third control valve 110c, such as a signal indicative of the third control valve 110c being in the open configuration or the closed configuration. The third control valve 110c and third internal valve 116c may be opened and closed manually by an operator or automatically (e.g. , when the third control valve 110c and third internal valve 116c are actuated by an electronic, pneumatic, magnetic, or electro-mechanical actuator).

The fourth control valve 110d may be fluidly coupled to the fourth internal valve 116d, which may be fluidly coupled to the fourth tank compartment 104d. The fourth control valve 110d may control the release of fluid from the fourth tank compartment 104d, such that fluid may be released from the fourth tank compartment 104d when the fourth control valve 110d and the fourth internal valve 116d are in an open configuration and fluid may not be released from the fourth tank compartment 104d when the fourth control valve 110d is in a closed configuration. When the fourth internal valve 116d and the fourth control valve 110d are both in the open configuration, then the liquid product in the fourth tank compartment 104d may flow out of the fourth tank compartment 104d, through the fourth internal valve 116d, and then through the fourth control valve 110d. A fourth control valve sensor 112d may be positioned proximate to the fourth control valve 110d. The fourth control valve sensor 112d may output a signal indicative of a position or configuration of the fourth control valve 110d, such as a signal indicative of the fourth control valve 110d being in the open configuration or the closed configuration. The fourth control valve 110d and fourth internal valve 116d may be opened and closed manually by an operator or automatically (e.g. , when the fourth control valve 110d and fourth internal valve 116d are actuated by an electronic, pneumatic, magnetic, or electro-mechanical actuator).

The fifth control valve 110e may be fluidly coupled to the fifth internal valve 116e, which may be fluidly coupled to the fifth tank compartment 104e. The fifth control valve 110e may control the release of fluid from the fifth tank compartment 104e, such that fluid may be released from the fifth tank compartment 104e when the fifth control valve 110e and the fifth internal valve 116e are in an open configuration and fluid may not be released from the fifth tank compartment 104e when the fifth control valve 110e is in a closed configuration. When the fifth internal valve 116e and the fifth control valve 110e are both in the open configuration, then the liquid product in the fifth tank compartment 104e may flow out of the fifth tank compartment 104e, through the fifth internal valve 116e, and then through the fifth control valve 110e. A fifth control valve sensor 112e may be positioned proximate to the fifth control valve 110e. The fifth control valve sensor 112e may output a signal indicative of a position or configuration of the fifth control valve 110e, such as a signal indicative of the fifth control valve 110e being in the open configuration or the closed configuration. The fifth control valve 110e and fifth internal valve 116e may be opened and closed manually by an operator or automatically (e.g. , when the fifth control valve 110e and fifth internal valve 116e are actuated by an electronic, pneumatic, magnetic, or electro-mechanical actuator).

The sixth control valve 110f may be fluidly coupled to the sixth internal valve 116f, which may be fluidly coupled to the sixth tank compartment 104f. The sixth control valve 110f may control the release of fluid from the sixth tank compartment 104f, such that fluid may be released from the sixth tank compartment 104f when the sixth control valve 110f and the sixth internal valve 116f are in an open configuration and fluid may not be released from the sixth tank compartment 104f when the sixth control valve 110f is in a closed configuration. When the sixth internal valve 116f and the sixth control valve 110f are both in the open configuration, then the liquid product in the sixth tank compartment 104f may flow out of the sixth tank compartment 104f, through the sixth internal valve 116f, and then through the sixth control valve 110f. A sixth control valve sensor 112f may be positioned proximate to the sixth control valve 110f. The sixth control valve sensor 112f may output a signal indicative of a position or configuration of the sixth control valve 110f, such as a signal indicative of the sixth control valve 110f being in the open configuration or the closed configuration. The sixth control valve 110f and sixth internal valve 116f may be opened and closed manually by an operator or automatically (e.g. , when the sixth control valve 110f and sixth internal valve 116f are actuated by an electronic, pneumatic, magnetic, or electro-mechanical actuator).

In embodiments, one or more of the plurality of control valves 110a, . . . , 110f may be a control valve as described in U.S. Pat. No. 9,823,665, previously cited in this disclosure. In embodiments, one or more of the plurality of control valves 110a, . . . , 110f may be an API Adaptor, model number 891BA-LK by Civacon, though embodiments are not limited thereto.

Each of the control valves 110a, . . . , 110b may include a control valve lever (not shown) that may be coupled to the control valve 110 and may be used to manually (e.g. physically) transition the control valve 110a, . . . , 110f from a normally closed configuration to an open configuration. In embodiments, each of the control valves 110a, . . . , 110f may have an actuator, such as an electronic, pneumatic, magnetic, or electro-mechanical actuator, so that each of the control valves 110a, . . . , 110f may be opened automatically. Each of the control valves 110a, . . . , 110f may include a lock, such as a pneumatic or electronic lock mechanism, coupled to the body of the control valve 110. The lock may have a normally locked state. When operated by the system controller 130, the lock may transition from the normally locked state to the unlocked state, thereby enabling the operator to open the control valve 110 using the control valve lever or actuator. The lock may be coupled to the control valve lever internal to the body of the control valve 110 and may mechanically restrict (i.e. stop) the movement of the control valve 110 when in the normally locked state.

Referring again to FIG. 1, the hose tag readers 114a, . . . , 114f may include one or more of a first hose tag reader 114a, a second hose tag reader 114b, a third hose tag reader 114c, a fourth hose tag reader 114d, a fifth hose tag reader 114e, and/or a sixth hose tag reader 114f. The first hose tag reader 114a may be associated with the first tank compartment 104a. In embodiments, the first hose tag reader 114a may be an RFID tag reader operable to read an RFID tag on an output-end of a loading hose or loading arm 502 when the loading hose or loading arm 502 is mechanically connected to a connection point on the product transport vehicle 102 that is in fluid communication with the first tank compartment 104*a*. The second hose tag reader 114*b* may be associated with the second tank compartment 104*b*. In embodiments, the second hose tag reader 114*b* may be an RFID tag reader operable to read an RFID tag on the output-end of a loading hose or loading arm 502 when the loading hose or loading arm 502 is mechanically connected to a connection point on the product transport vehicle 102 that is in fluid communication with the second tank compartment 104*b*. The third hose tag reader 114*c* may be associated with the third tank compartment 104*c*. In embodiments, the third hose tag reader 114*c* may be an RFID tag reader operable to read an RFID tag on the output-end of a loading hose or loading arm 502 when the loading hose or loading arm 502 is mechanically connected to a connection point on the product transport vehicle 102 that is in fluid communication with the third tank compartment 104*c*. The fourth hose tag reader 114*d* may be associated with the fourth tank compartment 104*d*. In embodiments, the fourth hose tag reader 114*d* may be an RFID tag reader operable to read an RFID tag on the output-end of a loading hose or loading arm 502 when the loading hose or loading arm 502 is mechanically connected to a connection point on the product transport vehicle 102 that is in fluid communication with the fourth tank compartment 104*d*. The fifth hose tag reader 114*e* may be associated with the fifth tank compartment 104*e*. In embodiments, the fifth hose tag reader 114*e* may be an RFID tag reader operable to read an RFID tag on the output-end of a loading hose or loading arm 502 when the loading hose or loading arm 502 is mechanically connected to a connection point on the product transport vehicle 102 that is in fluid communication with the fifth tank compartment 104*e*. The sixth hose tag reader 114*f* may be associated with the sixth tank compartment 104*f*. In embodiments, the sixth hose tag reader 114*f* may be an RFID tag reader operable to read an RFID tag on the output-end of a loading hose or loading arm 502 when the loading hose or loading arm 502 is mechanically connected to a connection point on the product transport vehicle 102 that is in fluid communication with the sixth tank compartment 104*f*. In embodiments, one or more of the plurality of hose tag readers 114*a*, . . . , 114*f* may be a hose tag reader as described in U.S. Pat. No. 9,823,665, previously cited in this disclosure, though embodiments are not limited thereto.

Figure 3:
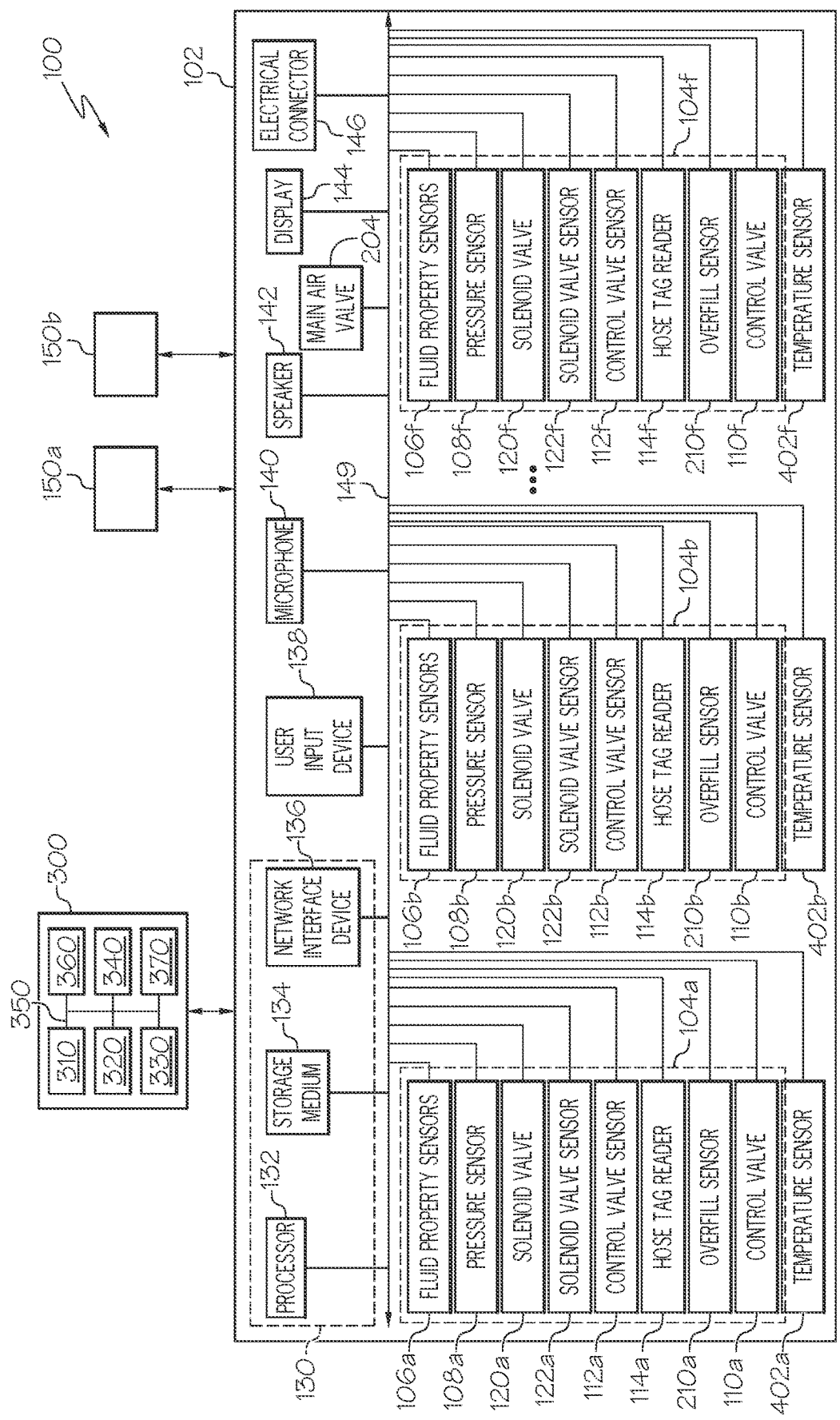
FIG. 3 schematically depicts a diagram of the product delivery system of FIG. 1, according to one or more embodiments shown and described herein.

Referring now to FIG. 3, a product delivery system 100 of the product transport vehicle 102 is schematically depicted. The product delivery system 100 includes a system controller 130, which includes at least a processor 132 and a storage medium 134 communicatively coupled to the processor 132. The system controller 130 may also include a network interface device 136 communicatively coupled to the processor 132. The product delivery system 100 may further include a user input device 138, a microphone 140, a speaker 142, a display 144, an electrical connector 146, and a communication path 149. The plurality of fluid property sensors 106*a*, . . . , 106*f*, the plurality of temperature sensors 402*a*, . . . , 402*e*, the plurality of pressure sensors 108*a*, . . . , 108*f*, the plurality of control valves 110*a*, . . . , 110*f*, plurality of locking mechanisms, plurality of control valve sensors 112*a*, . . . , 112*f*, the plurality of hose tag readers 114*a*, . . . , 114*f*, the main air valve 204, the plurality of solenoid valves 120*a*, . . . , 120*f*, the plurality of solenoid valve sensors 122*a*, . . . , 122*f*, and the plurality of overfill sensors 210*a*, . . . , 210*f* may be communicatively coupled to the system controller 130 through the communication path 149. Additionally, each of the user input device 138, the microphone, 140, the speaker 142, the display 144, and the electrical connector 146 may be communicatively coupled to the system controller 130 through the communication path 149.

Still referring to FIG. 3, the communication path 149 may be formed from any medium that is capable of transmitting a signal such as, for example, conductive wires, conductive traces, optical waveguides, or the like. Moreover, the communication path 149 may be formed from a combination of mediums capable of transmitting signals. In embodiments, the communication path 149 may include a combination of conductive traces, conductive wires, connectors, and buses that cooperate to permit the transmission of electrical data signals to components such as processors, memories, sensors, input devices, output devices, and communication devices. Accordingly, the communication path 149 may comprise a vehicle bus, such as for example a LIN bus, a CAN bus, a VAN bus, and the like. Additionally, it is noted that the term "signal" may refer to a waveform (e.g. , electrical, optical, magnetic, mechanical or electromagnetic), such as DC, AC, sinusoidal-wave, triangular-wave, square-wave, vibration, and the like, capable of traveling through a medium. The communication path 149 may communicatively couple the various components of the product delivery system 100, including the system controller 130 (which includes the processor 132, the storage medium 134, and the network interface device 136), the user input device 138, the microphone 140, the speaker 142, the display 144, the electrical connector 146, the plurality of fluid property sensors 106*a*, . . . , 106*f*, the plurality of temperature sensors 402*a*, . . . , 402*f*, the plurality of pressure sensors 108*a*, . . . , 108*f*, the plurality of control valves 110*a*, . . . , 110*f*, the plurality of locking mechanisms, the plurality of control valve sensors 112*a*, . . . , 112*f*, the plurality of hose tag readers 114*a*, . . . , 114*f*, the main air valve 204, the plurality of solenoid valves 120*a*, . . . , 120*f*, the plurality of solenoid valve sensors 122*a*, . . . , 122*f*, the plurality of overfill sensors 210*a*, . . . , 210*f*, and combinations of these. As used herein, the term "communicatively coupled" means that coupled components are capable of exchanging data signals with one another such as, for example, electrical signals via conductive medium, electromagnetic signals via air, optical signals via optical waveguides, and the like.

Still referring to FIG. 3, the processor 132 may be any device capable of executing machine readable instructions. Accordingly, the processor 132 may be a controller, an integrated circuit, a microchip, a computer, or any other computing device. The processor 132 may be communicatively coupled to the other components of the product delivery system 100 by the communication path 149. While FIG. 3 shows one processor 132, in embodiments, the product delivery system 100 may include multiple processors 132 communicatively coupled by the communication path 149. Communicatively coupling the multiple processors by the communication path 149 may allow multiple processors to operate in a distributed computing environment.

Still referring to FIG. 3, the storage medium 134 may be coupled to the communication path 149 and communicatively coupled to the processor 132. The storage medium 134 may comprise RAM, ROM, flash memories, hard drives, or any device capable of storing machine readable instructions such that the machine readable instructions can be accessed and executed by the processor 132. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the storage medium 134. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 3, the product delivery system 100 may include one or more of a user input device 138, microphone 140, speaker 142, and/or display 144. The display 144 may be coupled to the communication path 149 and communicatively coupled to the processor 132. The display 144 may be any device capable of providing visual output such as, for example, a schematic representation of the product transport vehicle 102 and information pertaining to unloading fluid therefrom, as will be described below. The display 144 may also display information pertaining to loading of fluids to the tank compartments of the product transport vehicle 102. The user input device 138 may be coupled to the communication path 149 and communicatively coupled to the processor 132. The user input device 138 may be any device capable of transforming mechanical, optical, electrical signals, or sound waves into a data signal capable of being transmitted with the communication path 149. The speaker 142 may be coupled to the communication path 149 and communicatively coupled to the processor 132. The speaker 142 may transform data signals into mechanical vibrations, such as in order to provide information related to operation of the product delivery system 100. The microphone 140 is coupled to the communication path 149 and communicatively coupled to the processor 132. The microphone 140 may be any device capable of receiving a mechanical vibration at the microphone and transforming the received mechanical vibration into an electrical signal indicative of the received mechanical vibration.

In embodiments, the product delivery system 100 may further include an electrical connector 146 communicatively coupled to the system controller 130. The electrical connector 146 may be operable to communicatively couple the system controller 130 to an external system, such as but not limited to a loading system controller at a loading station, via a hard wire connection. The electrical connector 146 may include one or more of a power connection for providing power to the system controller 130, one or a plurality of communication cables for providing electronic communications to and from the system controller 130, a ground wire for grounding the system during operation, one or a plurality of connection sensors for determining when the electrical connector 146 is connected to an external system. In embodiments, the electrical connector 146 may be an electrical socket providing a plurality of electrical connections. The electrical connector 146 may be connectable to a mating electrical connector communicatively and/or electrically coupled to an external system.

Still referring to FIG. 3, network interface device 136 may be coupled to the communication path 149 and communicatively coupled to the processor 132. The network interface device 136 may be physically coupled to the product transport vehicle 102. The network interface device 136 may be communicatively coupled to the processor 132 through communication path 149. The network interface device 136 may be any device capable of transmitting and/or receiving data via a network. Accordingly, the network interface device 136 can include a communication transceiver 458 for sending and/or receiving any wired or wireless communication. For example, the network interface device 136 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface device 136 can include a wireless communication module configured to send and receive wireless communication with other devices. In embodiments, network interface device 136 may communicate wirelessly according to the IrDA, Bluetooth, Wireless USB, Z-Wave, ZigBee, and/or any other wireless communication protocols. In embodiments, the network interface device 136 may communicate wirelessly with one or more external networks or systems, such as but not limited to the loading system at the loading station, the fleet management system, a cloud network system (cloud system), or combinations of these, through a private secure cellular pipeline.

Figure 6:
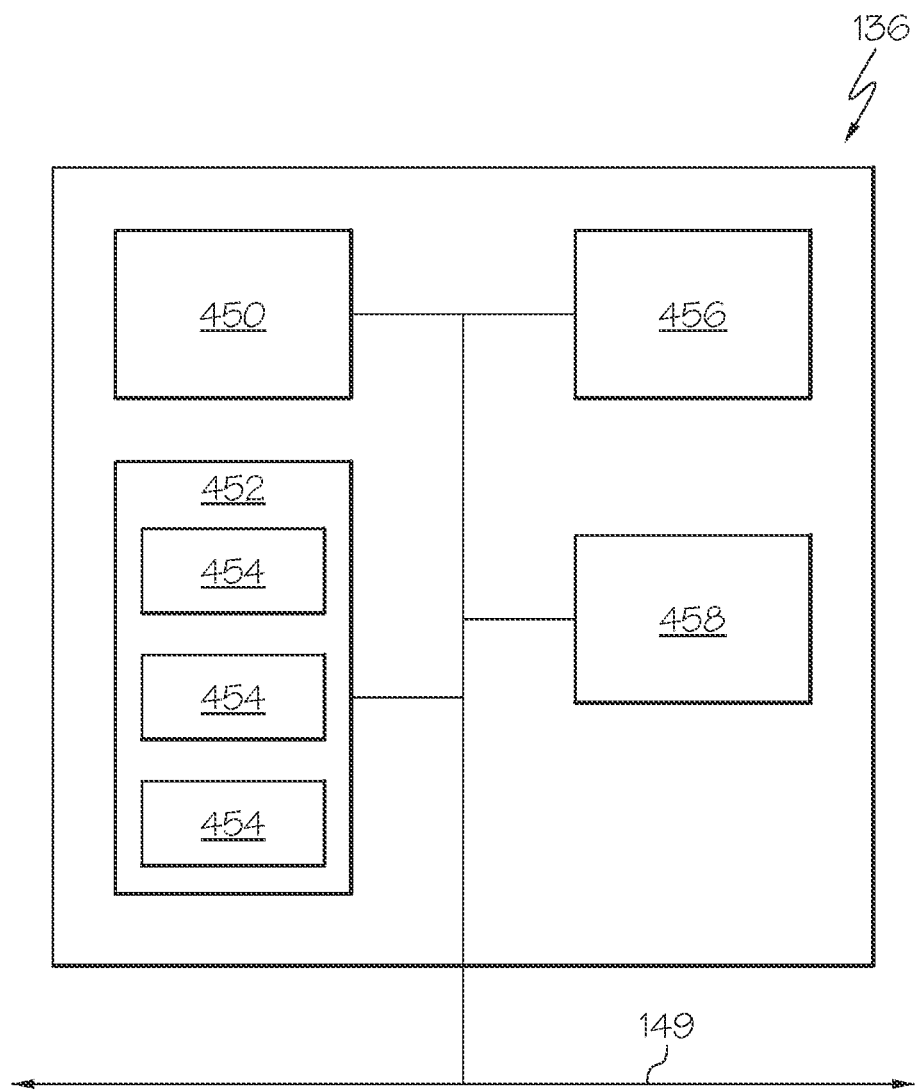
FIG. 6 schematically depicts a diagram of a network interface device of the product delivery system of FIG. 2, according to one or more embodiments shown and described herein.

Referring to FIG. 6, the network interface device 136 may further include at least one network interface device processor 450, one or more network interface device storage media 452, a GPS receiver 456, and machine readable instructions 454 stored on the network interface device storage media 452. The network interface device 136 may be operable to perform computations using input received from other components of the product delivery system 100, store data in the one or more network interface device storage media 452, and provide network connection between the product delivery system 100 and one or more external systems, such as but not limited to a loading system at a loading station, a fleet management system, a cloud system, or combinations of these. The machine readable instructions 454 stored on the network interface device storage media 452, when executed by the network interface device processor 450, may cause the network interface device 136 to receive data from the processor 130 or other component of the product delivery system 100. The data received may include one or more events, alarms, or errors generated by the product delivery system 100. Events may include loading or unloading actions, such as turning on the main air valve, connecting hoses, opening or closing the control valves or internal valves, or other actions relating to operation of the product delivery vehicle 102. Alarms can include fuel type mismatches, volume mismatches, high or low temperature, high pressure, overfill conditions, fault probes, or other alarms. Errors may include but are not limited to loose or non-functioning instruments, connectivity outages, or other errors. The machine readable instructions 454, when executed by the network interface device processor 450, may combine each event, alarm, or error received from the product delivery system 100 with a time stamp and GPS information from the GPS receiver 456. The machine readable instructions 454, when executed by the network interface device processor 450, may cause the network interface device 136 to transmit the type of event or alarm, time stamp, and GPS information to one or more external systems (e.g., loading system, fleet management system, cloud system) through one or more networks.

Referring again to FIG. 3, in embodiments, the product delivery system 100 may include a separate tag reader unit 300. The tag reader unit 300 may be used in place of or in addition to the tank delivery connectors 150a, 150b. In these embodiments, the system controller 130 of the product delivery system 100 may be in electronic communication with the tag reader unit 300. The tag reader unit 300 may include a tag reader 310. The tag reader unit 300 may also include a tag reader processor 320, one or more tag reader storage mediums 330, a tag reader network interface hardware 340, and a tag reader communication path 350. Tag reader 310, tag reader processor 320, tag reader storage mediums 330, and tag reader network interface hardware 340 may be communicatively coupled to each other through the tag reader communication path 350. The tag reader 310, tag reader processor 320, tag reader storage mediums 330, tag reader network interface hardware 340, and tag reader communication path 350 may have any of the features or characteristics previously described herein for other tag readers, processors, storage mediums, network interface hardware, and communication paths, respectively.

Tag reader 310 may be coupled to the tag reader communication path 350 and communicatively coupled to the tag reader processor 320. The tag reader 310 may be a tag reader configured to read a tank tag of a distribution tank when the tag reader 310 is positioned sufficiently near the tank tag. Similarly, the tag reader 310 of the tag reader unit 300 may also be configured to read a tag of a delivery hose when the tag reader 310 is positioned sufficiently near the hose tag. The tag reader unit 300 may additionally include a display 360 and/or a user input device 370 to enable the operating to interface with the tag reader unit 300.

Figure 4:
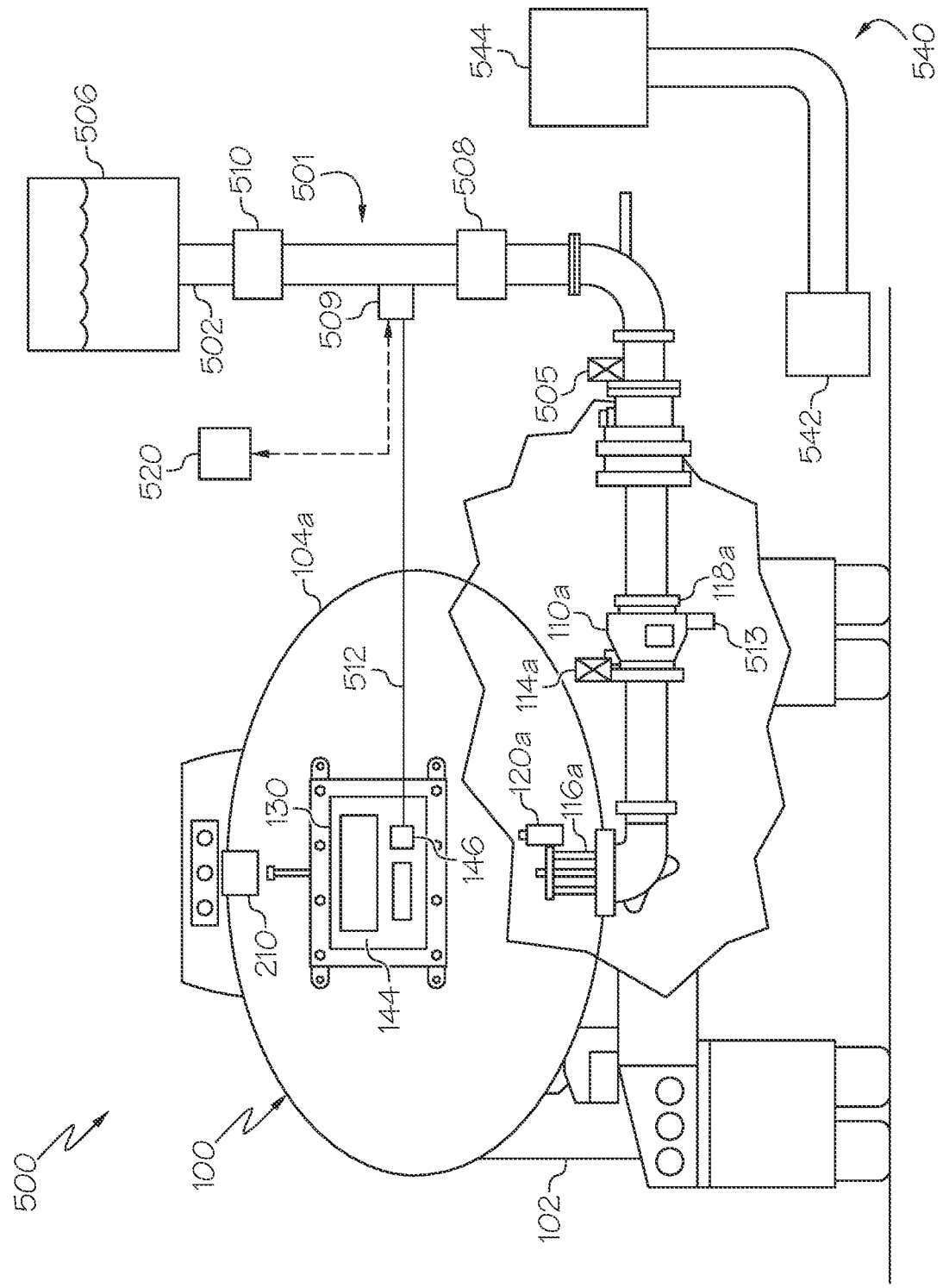
FIG. 4 schematically depicts the product transport vehicle of FIG. 1 positioned at a loading station, according to one or more embodiments shown and described herein.

Referring now to FIG. 4, the product transport vehicle 102 positioned at a loading station 500 is depicted. The loading station 500 may generally include at least one holding vessel 506 for storing product that is to be loaded into the tank compartments 104. The holding vessel 506 can be either gravity driven or liquid product can be pulled from the holding vessel 506 via a pump 508. In embodiments, the loading station 500 may include a plurality of holding vessels 506 and a plurality of pumps 508, each of the plurality of holding vessels 506 containing a different liquid product or the same liquid product.

The loading station 500 may include the loading arm 502, which may be fluidly coupled to at least one of the holding vessels 506. The loading arm 502 may be operable to transport the liquid product from the holding vessel 506 to one of the tank compartment 104a, . . . , 104b of the product transport vehicle 102. A valve 510 can be positioned on the loading arm 502 to control flow of liquid product through loading arm 502. The loading arm 502 may include a loading tag 505, which may include a unique identifier for the loading arm 502. The loading tag 505 may optionally include information on the identity of liquid product in the holding vessel 506 to which the loading arm 502 is fluidly coupled. One or more loading hoses can also be used if the loading arm 502 is not long enough to reach the product transport vehicle 102.

Additionally, in embodiments, the loading station 500 may also include a vapor recovery system 540, which may be operable to collect and treat volatile vapors generated from the loading process or present in the headspace of the tank compartments 104a, . . . , 104f during loading. The vapor recovery system 540 may include at least one vapor adaptor connection 542 for collecting volatile vapors from the loading operation and conveying the volatile vapors to a recovery or treatment system 544. Though not depicted, it is understood that the loading system 501 may additionally include other valves, gauges, sensors, flow meters, or other devices typical of loading systems.

Referring to FIG. 4, in embodiments, the product delivery system 100 may further include a loading arm sensor 513 communicatively coupled to the system controller 130. The loading arm sensor 513 may be mounted proximate to the hose adaptor 118 and may provide a loading arm signal to the system controller 130 to determine when the loading arm 502 is fluidly coupled to the hose adaptor 118. If the loading arm sensor 513 indicates that the loading arm 502 is not coupled to the hose adaptor 118, the system controller 130 may display on the display 144 that the loading arm 502 is not coupled to any of the tank compartments 104 of the product transport vehicle 102 and the system controller 130 may maintain the internal valve 116 in the normally closed position and/or maintain the control valve 110 in the normally locked state to prevent a spill.

A loading hose can be optional for the loading process and may include a first input-end hose tag at an input end of the loading hose and a first output-end hose tag at an output end of the first loading hose. In embodiments, the input end of the loading hose may be configured to be mechanically connected the loading arm 502 at the loading station 500. The first input-end hose tag may be read by a loading arm hose tag reader coupled to the loading arm 502. The output end of the loading hose may be configured to be mechanically connected to the hose adapter 118a, . . . , 118f of the tank compartment 104a, . . . , 104f to be loaded. The first output-end hose tag may be read by a hose tag reader (e.g., any of the plurality of hose tag readers 114a, . . . , 114f) coupled to the hose adapter 118a, . . . , 118f corresponding to the tank compartment 104a, . . . , 104f to be loaded.

The product delivery systems 100 of the present disclosure may be operable to reduce or prevent overfilling of the tank compartments 104 during loading and improve tank compartment utilization and efficiency of the product delivery process. The product delivery system 100 of the present disclosure may reduce or prevent errors in record keeping of product inventory and delivery amounts. The product delivery system 100 of the present disclosure may also be operable to communicate with all the stages of the delivery process to further increase utilization of the tank compartments 104 of the product transport vehicle 102, such as by comparing an available volume in a distribution tank at a distribution station to the available volumes in the tank compartments 104 of the product transport vehicle 102 and to the volume intended to be shipped, so that the correct tank compartment 104 of the product transport vehicle 102 can be selected. The product delivery systems 100 of the present disclosure may also be operable to communicate information on the performance of the product transport vehicle 102 to one or more external systems, such as but not limited to the loading system at the loading station, the fleet management system, and/or the cloud system, for example. Other benefits and features of the product delivery systems 100 of the present disclosure may also be recognized by persons of ordinary skill in the art. Operation of the product delivery system 100 of the present disclosure and methods of using the product delivery system 100 to load liquid products onto the product transport vehicle 102 will now be described in further detail.

Referring to FIG. 4, a product transport vehicle 102 is schematically depicted at a loading station. As a product transport vehicle 102 approaches the loading system 501, to begin a loading process, each tank compartment 104a, . . . , 104f may have a different available volume in which to place liquid product. For example, one or more of the tank compartments 104a, . . . , 104f could be empty, while the other tank compartments 104a, ... 104f may have retained liquid product not unloaded during the previous delivery run.

At the loading station 500, one or more of the tank compartments 104a, ..., 104f may be fluidly coupled to the loading system 501. The tank compartment 104a, ..., 104f may be fluidly coupled to the loading system 501 by connecting the loading arm 502 of the loading system 501 directly to the hose adapter 118a, ..., 118f corresponding to the tank compartment 104a, ..., 104f to be loaded. In embodiments, loading hoses may be used to connect the loading arm 502 to the hose adaptor 118a, ..., 118f. In embodiments, the vapor adaptor connection 542 of the vapor recovery system 540 may be fluidly coupled to the tank compartment 104a, ..., 104f to be loaded.

In addition to fluidly connecting the product transport vehicle 102 to the load station 500, the system controller 130 of the product delivery system 100 may be communicatively coupled to the loading station control unit 509 via the electrical connector 146 and cable 512 or through wireless communication between the loading station control unit 509 and the system controller 130. Additionally or alternatively, in embodiments, the system controller 130 may be communicatively coupled to the fleet management system or the cloud system, either through wireless communications or through communication through the loading station control unit 509. Communicatively coupling the system controller 130 to the loading station control unit 509, the fleet management system, and/or the cloud system may enable the system controller 130 to pass information to and receive information from the loading station control unit 509, the fleet management system, and/or the cloud system.

The air system 200 of the product transport vehicle 102 may be activated by opening the main air valve 204. Activating the air system 200 of the product transport vehicle 102 may also include turning on a compressor for providing compressed air to the air system 200 or fluidly coupling the air system 200 to a compressed air source at the loading station 500. In embodiments, the system controller 130 may be operable to receive a user input indicative of a command to open the main air valve 204 from the user input hardware 138 of the system controller 130 and to transmit an open signal to the actuator 205 of the main air valve 204. The actuator 205 of the main air valve 204 may be operable to transition the main air valve 204 from a normally closed position to an open position in response to the open signal received from the system controller 130.

In some instances, the product transport vehicle 102 may arrive at the loading station completely empty. In the "empty" state, the system controller 130 may have the loaded liquid type in a particular tank compartment 104a, ..., 104f set either by the operator using a user input hardware 138, by the fluid property sensor (FPS) 106a, ..., 106f determining the transported liquid type, by the FPS 106a, ..., 106f indicating a "dry" sensor condition, or by the pressure sensor 108a, ..., 108f indicating the amount of liquid product is zero or near zero. In the later cases, the loaded liquid type may be set to "empty" when there is no liquid product in a particular tank compartment 104a, ..., 104f. In embodiments, the product transport vehicle 102 may arrive at the loading station with at least one of the plurality of tank compartments 104a, ..., 104f empty, as for example if the product transport vehicle 102 just returned from a product delivery run.

The system controller 130 may store the last status from the product delivery run for each tank compartment 104a, ..., 104f in the storage medium 134. For example, if one of the tank compartments 104a, ..., 104f is empty, the system controller 130 may set the last status of the particular tank compartment 104a, ..., 104f to "empty" automatically based on readings from either the pressure sensor 108a, ..., 108f or FPS 106a, ..., 106f and without input from the operator. The system controller 130 may display the last status of the tank compartment 104a, ..., 104f on the display 144. The signals received from the pressure sensor 108a, ..., 108f or from the FPS 106a, ..., 106f may indicate that one or more of the tank compartments 104a, ..., 104f may contain retained liquid product not delivered in the previous delivery run. When retained liquid product is present, the system controller 130 may display on the display 144 an error code, which may include a message that may alternate between one or more of "Prior Product Grade," "Retained Product," and "Frustrated Load" to indicate that the tank compartment 104a, ..., 104a is not empty but contains a volume of liquid product. The "Prior Product Grade" message may indicate what liquid product was in the tank compartment 104a, ..., 104f. The "Retained Product" message may indicate that there is liquid product left in the tank compartment 104a, ..., 104f. The "Frustrated Load" message may indicate that not the entire product was delivered to the distribution tank at the delivery destination. To alert the operator to make a selection before filling the tank compartments 104a, ..., 104f, the system controller 130 may provide an alarm, such as a visual alarm displayed on the display 144 or an audio alarm transmitted by the speaker 142, for example. Additionally, the system controller 130 may provide the operator with a visual indication of the volume of liquid product retained within each tank compartment 104a, ..., 104f after the delivery run. The visual indication of the volume of liquid product retained within each tank compartment 104a, ..., 104f may be displayed on the display 144.

The signal from the pressure sensor 108a, ..., 108f or from the FPS 106a, ..., 106f indicating retained liquid product remaining in the tank compartment 104a, ..., 104f may be used to prevent loading of the tank compartment 104a, ..., 104f at the loading station 500 by maintaining the control valve 110a, ..., 110f, internal valve 116a, ..., 116f, or both, which are associated with each of the tank compartments 104a, ..., 104f, in the closed and/or locked positions. The system controller 130 may include machine readable instructions that, when executed by the processor 132 may cause the system controller 130 to receive a signal from the pressure sensor 108a, ..., 108f, the FPS 106a, ..., 106f, or both, indicating liquid product retained in one or more tank compartments 104a, ..., 104f. The system controller 130 may maintain the control valves 110a, ..., 110f, the internal valves 116a, ..., 116f, or both, corresponding to the tank compartments 104a, ..., 104f containing retained liquid product in the normally closed state or in the normally closed and locked state to prevent loading the tank compartments that contain retained liquid product. The closed and/or locked state of the control valves 110a, ..., 110f, the internal valves 116a, ..., 116f, or both, for tank compartments 104a, ..., 104f may provide an indication to the operator of the transport vehicle 102 of retained liquid product in one or more tank compartments. The closed and/or locked state of the control valves 110a, ..., 110f, the internal valves 116a, ..., 116f, or both, may be manually overridden by the operator or may be transitioned to the unlocked state by the system controller 130 once the system controller 130 confirms any of the other preconditions described herein, such as but not limited to comparison of the volume of product to be shipped to the available space in the tank compartment, comparison of the type of liquid product to be loaded and the type of liquid product retained, or other precondition subsequently described in this disclosure.

The product delivery systems 100 disclosed herein may be operable to obtain the type and volume of liquid product to be transported from the loading system 501 at the loading station 500, the fleet management system, and/or the cloud system and compare the type and volume of the liquid product to be transported to the volumes of the tank compartments 104a, ..., 104f, the type of liquid product retained or previously occupying the tank compartments 104a, ..., 104f, and other parameters. Based on the comparison, the product delivery system 100 may prevent or allow loading of the liquid product into the tank compartment 104a, ..., 104f by operating the control valve 110a, ..., 110f, internal valve 116a, ..., 116f, or both, which are associated with each of the tank compartments 104a, ..., 104f. This may allow prevention of loading errors before loading of the tank compartment 104a, ..., 104f even begins. Any of the operations of the product delivery system 100 subsequently disclosed herein may be accomplished by executing machine readable instructions stored on the storage mediums 134 by the processor 132.

Referring to FIGS. 3 and 4, the product delivery system 100 may be operable to establish a communication path between the network interface device 136 and the loading system 501 at the loading station 500, the fleet management system, the cloud system, or combinations of these. The fleet management system may refer to a system for tracking and managing a fleet of a plurality of product transport vehicles 102 and coordinating the process of delivering liquid products from one or more loading stations 500 to one or more distribution stations via the plurality of product transport vehicles 102. As previously discussed herein, the product delivery system 100 may be configured to communicate with the loading system 501, the fleet management system, and/or the cloud system through wireless or wired communication. For example, the product delivery system 100 may be communicatively and/or electrically coupled to the loading station control unit 509 of the loading system 501 through a hard-wired connection, which may include connection through the socket 146 or other electrical or communication connection. Additionally, the product delivery system 100 may be communicatively coupled to the loading station control unit 509 of the loading system 501 at the loading station 500, to the fleet management system, and/or to the cloud system through wireless communications, as previously discussed herein.

Figure 5:
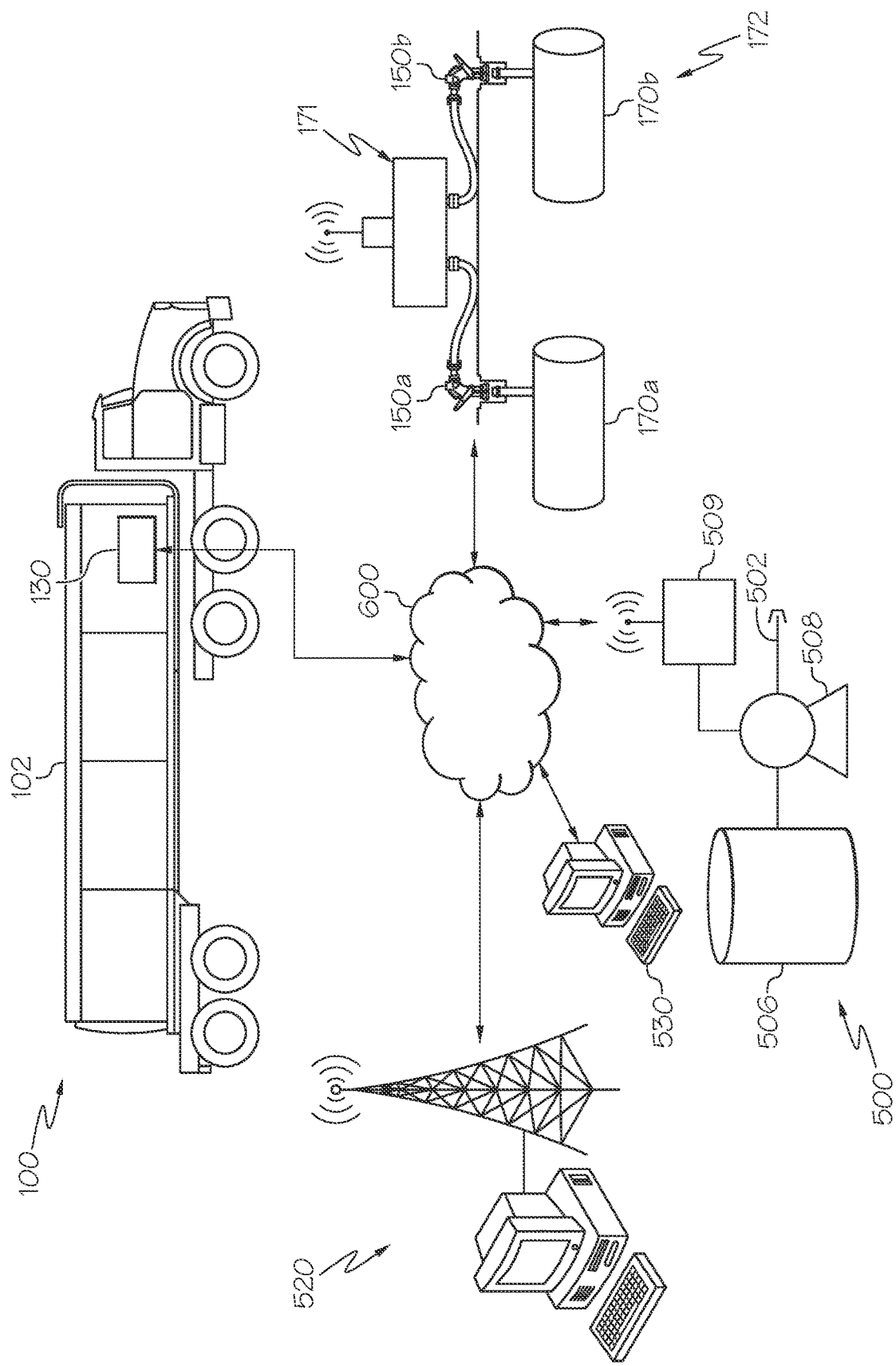
FIG. 5 schematically depicts a distributed computing environment of the product transport vehicle of FIG. 1, according to one or more embodiments shown and described herein.

Referring now to FIG. 5, a distributed computing environment is depicted in which the product delivery system 100, the loading station control unit 509 of the loading system 501 at the loading station 500, the feet management system 520, the cloud system 530, and a distribution station control unit 171 at a distribution station 172 may be in electronic communication with each other via network 600. In embodiments, the product delivery system 100 may be communicatively coupled directly to one or more distribution station control units 171 at one or more distribution stations 172 through the network 600. In other embodiments, the fleet management system 520 may be communicatively coupled to each of the distribution station control units 171 through the network 600, and information from the distribution station control units 171 may be communicated from the fleet management system 520 to the product delivery system 100 through the network 600. The network 600 may be a wireless network. Establishing a communication path between the network interface device 136 and the loading system 501 at the loading station 500, the fleet management system 520, the cloud system 530, and/or a distribution station control unit 171 may include electronically pairing the product delivery system 100 to the loading system 501, fleet management system 520, and/or distribution station control unit 171. As used herein, the term "electronic pairing" may refer to a process of establishing a connection (communications link) between two wireless devices, such as a process of exchanging and verifying unique device identification numbers (IDs) by each device intended to be communicatively coupled. Other means of electronically pairing the various wireless devices of the present application for electronic communication are also contemplated. The term "pairing" is not intended to imply or require any sort of mechanical or physical connection between the two wireless devices that are paired.

Referring again to FIG. 4, in embodiments, at least a portion of the network 600 may include hard-wired connections, such as the electrical connection between the product delivery system 100 and the loading system 501 via the socket 146 connection. In embodiments, the network interface device 136 may include the electrical socket 146 operable to communicatively couple the system controller 130 to the loading system 501 at the loading station 500, and computer readable and executable instructions, when executed by the processor 132, may cause the system controller 130 to determine that the electrical socket 146 is coupled to the loading system 501 at the loading station 500 before establishing the communication path between the network interface device 146 and the loading system 501.

Once the communication path between the network interface device 136 and the loading system 501, fleet management system 520, cloud system 530, and/or distribution station control unit 171 is established, the product delivery system 100 may be operable to receive information from the loading system 501, fleet management system 520, cloud system 530, and/or distribution station control unit 171. The product delivery system 100 may be operable to receive one or more of a shipping volume, shipping liquid product type, distribution tank available volume, distribution tank product type, delivery destination, or any other electronically transferrable information from the loading system 501, the fleet management system 520, and/or the cloud system 530. The information may be transmitted from the loading system 501, fleet management system 520, and/or cloud system 530 and received by the product delivery system 100 once the communication path is established. Alternatively, the product delivery system 100 may send a control signal to the loading system 501, fleet management system 520, and/or cloud system 530 requesting the information, and the loading system 501, fleet management system 520, and/or cloud system 530 may respond by sending a return signal indicative of the information requested. In some cases, the product delivery system 100 may be configured to retrieve the desired information from a predetermined storage location on one or more storage mediums communicatively coupled to the loading system 501, fleet management system 520, and/or cloud system 530. Other known techniques, methods, or protocols for transferring the requested information to the product delivery system 100 may also be used.

In embodiments, the product delivery system 100 may be operable to receive a shipping volume from the loading system 501, the fleet management system 520, and/or the cloud system 530. The shipping volume may be a volume of a liquid product scheduled to be loaded into a particular tank compartment 104a, ..., 104f for delivery to a distribution tank 170a, 170b (FIG. 5) at a distribution station 172. In embodiments, the product delivery system 100 may be operable to receive a shipping liquid type of the liquid product to be loaded into the tank compartment 104a, . . . , 104f. The shipping volume and/or shipping liquid type of the liquid product to be loaded may be information associated with a bill-of-lading or other collection of shipping information generated to fulfil a sales order and stored in the loading system 501, the fleet management system 520, and/or the cloud system 530. In embodiments, the product delivery system 100 may be operable to receive a destination volume from the loading system 501, the fleet management system 520, the cloud system 530, and/or a distribution station control unit 171 at a distribution station 172. The destination volume may be an available volume in a distribution tank 170a, 170b (FIG. 5) at a distribution station 172 to which the liquid product is to be delivered. The product delivery system 100 may be operable to receive a distribution liquid type of the liquid product in a distribution tank 170a, 170b at a distribution station 172 from the loading system 501, the fleet management system 520, the cloud system, or the distribution station control unit 171. The product delivery system 100 may be configured to receive any other information from the loading system 501, the fleet management system 520, the cloud system 530, and/or the distribution station control unit 171. The information received from the loading system 501, fleet management system 520, cloud system 530, and/or a distribution station control unit 171 at a distribution station 172 may be stored in the one or more storage mediums 134 communicatively coupled to the processor 132 of the system controller 130.

As previously discussed, the system controller 130 may receive additional information from one or more of the fluid property sensors 106a, . . . , 106f, pressure sensors 108a, . . . , 108f, solenoid valves 120a, . . . , 120f, control valve sensors 122a, . . . , 122f, hose tag readers 114a, . . . , 114f, overfill sensors 210a, . . . , 210f, control valves 110a, . . . , 110b, temperature sensors 402a, . . . , 402f, loading arm sensor 513, other sensor, or combinations of these. For example, the system controller 130 may be operable to receive electronic signals indicative of the transported liquid type in each tank compartment 104a, . . . , 104f from the fluid property sensors 106a, .. , 106f. The electronic signals received may be indicative of a density, viscosity, dielectric constant, light transmissivity, fluorescence, temperature, or combinations of these. The electronic signals form the FPS 106a, . . . , 106f may also be indicative of liquid product present in the tank compartment 104a, .. , 104f, such as in the event of retained liquid product or frustrated loads. The system controller 130 may be operable to receive electronic signals indicative of the volume of liquid product in each tank compartment 104a, . . . , 104f from the pressure sensors 108a, . . . , 108f. The system controller 130 may be operable to receive electronic signals indicative of a temperature of the liquid product in each tank compartment 104a, . . . , 104f from the temperature sensors 402a, . . . , 402f. In embodiments, the temperature of the liquid product in the tank compartment 104a, . . . , 104f may be used to temperature adjust a fluid property determined from the electronic signals received from the fluid property sensor 106a, . . . , 106f (adjust the electronic signal or the property determined from the signal to account for differences in the temperature of the fluid). The system controller 130 may be operable to receive electronic signals from the hose tag readers 114a, . . . , 114f and/or the loading arm sensor 513 indicating and/or confirming that a flow path has been established between one or more of the tank compartments 104a, . . . , 104f and the loading arm 502.

The product delivery system 100 may include information on the product transport vehicle 102 stored in the one or more storage mediums 134. Information on the product transport vehicle 102 may include the tank compartment volume for each of the tank compartments 104a, . . . , 104f, the transported liquid type of the liquid product previously transported in each of the tank compartments 104a, . . . , 104f, the retain volume and liquid product type of retained liquid product retained in one or more of the tank compartments 104a, . . . , 104f, or combinations of this information. The product delivery system 100 may also be operable to maintain an event log for operation of the product delivery system 100. The event log may be stored on the one or more storage mediums 134 and may include an event ID, time stamp, and GPS information for various operations of the product delivery system 100. The event log may also include type, time, and GPS information for alarms, errors, or both. Other information relating to the product transport vehicle 102 may be stored in the one or more storage mediums 134. In embodiments, the product delivery system 100 may be operable to transmit events, alarms, and/or errors along with the time stamp and GPS information for each event, alarm, or error to one or more external systems (e.g. , loading system, fleet management system, cloud system) via the network interface device 136.

Referring to FIG. 4, the product delivery system 100 may be operable to compare information for the product transport vehicle with the information obtained from the loading system 501, the fleet management system 520, the cloud system 530, the distribution station control unit 171 at a distribution station 172, or combinations of these. The product delivery system 100 may allow or disallow loading of the tank compartment 104a, . . . , 104f based on the comparison of the volumes. For example, the product delivery system 100 may have computer readable instructions that, when executed by the processor 132 may cause the product delivery system 100 to compare the shipping volume received from the loading system 501, the fleet management system 520, and/or the cloud system 530 to a tank compartment volume or an available volume of one or more of the tank compartments 104a, . . . , 104f. The tank compartment volume and/or the available volume may be stored in the storage medium 134. The tank compartment volume is the total volume of the tank compartment 104a, . . . , 104f when the tank compartment is completely empty. The available volume may be the volume of the tank compartment 104a, . . . , 104f that is available to receive liquid product without creating an overfill condition. In some circumstances, the tank compartment 104a, . . . , 104f may be empty, in which case the available volume may be equal to the tank compartment volume.

In some circumstances, the tank compartment 104a, . . . , 104f may contain retained liquid product such that the available volume is less than the tank compartment volume. As previously discussed, the product delivery system 100 may include level sensors, such as pressure sensors 108a, . . . , 108f, coupled to each of the tank compartments 104a, . . . , 104f. The level sensor (pressure sensors 108a, . . . , 108f) may be operable to transmit a level signal to the system controller 130 indicating an amount or volume of liquid product present in the tank compartment 104a, . . . , 104f. In embodiments, the level sensor may be the pressure sensor 108a, . . . , 108f coupled to the tank compartment 104a, . . . , 104f, and the pressure sensor 108a, ..., 108f may transmit a pressure signal to the system controller 130 that is indicative of the volume of liquid product present in the tank compartment 104a, ..., 104f. Computer readable and executable instructions, when executed by the processor, may cause the system controller 130 receive the level signal from the level sensor (e.g., pressure signal from pressure sensor 108a, ..., 108f) indicative of the amount of the liquid product retained in the tank compartment 104a, ..., 104f, determine a retained volume of liquid product retained in the tank compartment 104a, ..., 104f, and calculate an available volume of the tank compartment 104a, ..., 104f from the retained volume of liquid product retained in the tank compartment 104a, ..., 104f and the tank compartment volume stored in the storage medium 134. The available volume in the tank compartment 104a, ..., 104f may be calculated as the difference between the tank compartment volume and the retained volume of liquid product in the tank compartment 104a, ..., 104f. In embodiments, the system controller 130 may be operable to add the shipping volume and the retain volume to calculate a total load volume and then compare the total load volume to the tank compartment volume. In embodiments, the system controller 130 may be operable to retrieve a loading volume from the loading system 501, the fleet management system 520, and/or the cloud system 530 and calculate the shipping volume as the sum of the loading volume and the retain volume of liquid product retained in the tank compartment 104a, ..., Although described herein on the basis of volume, it is understood that the comparison between the amount of liquid product intended to be loaded into a tank compartment 104a, ..., 104f and the capacity of the tank compartment 104a, ..., 104f to receive the amount to be loaded may be made on the basis of any other data available to the product delivery system 100 from the loading system 501, the fleet management system 520, and/or the cloud system 530. For example, instead of a volume basis, the shipping amount and capacity may be compared based on weight/mass and density information without departing from the scope of the present disclosure. In embodiments, amount of liquid product to be shipped or amount to be loaded may be provided in the loading system 501, the fleet management system 520, and/or the cloud system 530 in pounds of weight or mass. In these situations, the product delivery system 100 may be operable to convert the amount of liquid product to be shipped or amount to be loaded to a shipping volume or loading volume, respectively, using a density of the liquid product to be shipped. The density of various liquid products may be stored in the storage medium 134. The density of the liquid products may be adjusted based on the temperature, as determined by the temperature sensors 402a, ..., 402f or other temperature sensor.

The product delivery system 100 may be operable to maintain a valve in the normally locked state based on the comparison of the shipping volume and the tank compartment volume or available volume in the tank compartment 104a, .., 104f to prevent the flow of the liquid product to be loaded into the tank compartment 104a, ..., 104f. The product delivery system 100 may be operable to transition the valve from the normally locked state to an unlocked state based on the comparison of the shipping volume to the tank compartment volume or the available volume in the tank compartment 104a, 104f, thereby permitting the flow of the liquid product to be loaded into the tank compartment 104a, ..., 104f. The valve can be the internal valve 116a, ..., 116f, the control valve 110a, ..., 110f, or both, associated with the particular tank compartment 104a, ..., 104f. As previously discussed, in embodiments, the product delivery system 100 may be operable to maintain the internal valve 116a, ..., 116f, the control valve 110a, ..., 110f, or both, for a tank compartment 104a, ..., 104f when the tank compartment 104a, ..., 104f contains retained liquid product as indicated by an electronic signal received from the pressure sensor 108a, ..., 108f, the FPS 106a, ..., 106f, or both.

The product delivery system 100 may compare the shipping volume received from the loading system 501, the fleet management system 520, and/or the cloud system 530 to the tank compartment volume by calculating an absolute difference between the shipping volume and the tank compartment volume. In this case, the absolute difference refers to the absolute value of the difference between the tank compartment volume and the shipping volume. The product delivery system 100 may then compare the absolute difference between the shipping volume and the tank compartment volume to a threshold amount. The threshold amount may be an incremental volume of the liquid product greater than the tank compartment volume that would result in an overflow condition of the tank compartment 104a, ..., 104f if loaded into the tank compartment 104a, ..., 104f. In embodiments, the threshold amount may be less than or equal to 5 U.S. gallons (gal), less than or equal to 4 gal, less than or equal to 3 gal, less than or equal to 2 gal, less than or equal to 1 gal, or even less than or equal to 0.5 gal. In embodiments, the product delivery system 100 may be operable to maintain the valve (e.g., internal valve 116a, ..., 116f, control valve 110a, ..., 110f, or both) in the normally locked state when the shipping volume and the tank compartment volume differ by greater than or equal to the threshold amount to prevent the flow of the liquid product to be loaded into the tank compartment 104a, ..., 104f. Likewise, the product delivery system 100 may be operable to transition the valve from the normally locked state to an unlocked state when the shipping volume and the tank compartment volume differ by less than the threshold amount, thereby, permitting the flow of the liquid product to be loaded into the tank compartment 104a, ..., 104f. When retained liquid product is present in the tank compartment 104a, ..., 104f, the product delivery system 100 may compare the shipping volume to the available volume in the tank compartment 104a, ..., 104f by calculating the absolute difference between the shipping volume and the available volume in the tank compartment 104a, ..., 104f.

In some circumstances, the shipping volume may be permitted to be less than the tank compartment volume but not greater than the tank compartment volume. The shipping volume may be less than the tank compartment volume or available volume by a predetermined amount. The predetermined amount may be an amount that provides a target efficiency for the tank compartment 104a, ..., 104f. If the predetermined amount is too great, then the efficiency of the tank compartment 104a, ..., 104f will be reduced to an unacceptable degree. Making the predetermined amount too small may cause the system to be inflexible and require too close of a match between the shipping volume and the tank compartment volume/available volume. The predetermined amount may be determined by the operator of the product transport vehicle 102 based on business considerations. In embodiments, the difference calculated by subtracting the shipping volume from either the tank compartment volume or the available volume of the tank compartment 104a, ..., 104f may be greater than or equal to 0% (zero percent) and less than or equal to 25% of the tank compartment volume, such as from 0% to 20%, from 0% to 15%, from 0% to 10%, or even from 0% to 5% of the tank compartment volume.

The comparison between the shipping volume and the tank compartment volume or available volume in the tank compartment 104a, . . . , 104f may also be made on the basis of a percentage of the tank compartment volume. For example, the product delivery system 100 may be operable to determine the absolute value of the difference between the shipping volume and the tank compartment volume (or available volume in the tank compartment) and divide the absolute difference (absolute value of the difference) by the tank compartment volume to obtain the absolute difference percentage, which is a percentage of the tank compartment volume. The absolute difference percentage may then be compared to a threshold percentage of the tank compartment volume. The threshold percentage of the tank compartment volume may correspond to a volume percentage (vol %) of the tank compartment volume that, when added in excess of the tank compartment volume, would result in an overfill condition in the tank compartment 104a, . . . , 104b. In embodiments, the threshold percentage of the tank compartment volume may be less than or equal to 5 vol %, less than or equal to 3 vol %, less than or equal to 2 vol %, less than or equal to 1 vol %, or even less than or equal to 0.5 vol %. In embodiments, the product delivery system 100 may be operable to maintain the valve (e.g. , internal valve 116a, . . . , 116f, control valve 110a, . . . , 110f, or both) in the normally locked state when the shipping volume and the tank compartment volume (or available volume) differ by greater than or equal to a threshold percentage of the tank compartment volume to prevent the flow of the liquid product to be loaded into the tank compartment 104a, . . . , 104f. Likewise, the product delivery system 100 may be operable to transition the valve from the normally locked state to an unlocked state when the shipping volume and the tank compartment volume (or available volume) differ by less than the threshold percentage of the tank compartment volume, thereby, permitting the flow of the liquid product to be loaded into the tank compartment 104a, . . . , 104f.

In embodiments, the product delivery system 100 for a product transport vehicle 102 having a plurality of tank compartments 104a, . . . , 104f may be operable to compare the shipping volume to the tank compartment volume or available volume of all of the tank compartments 104a, . . . , 104f and allow loading to occur only for tank compartments 104a, . . . , 104f having a tank compartment volume or available volume suitable for accommodating the shipping volume. For example, as previously discussed, the product transport vehicle 102 may include a plurality of tank compartments 104a, . . . , 104f and a plurality of valves (e.g. , control valves 110a, . . . , 110f, internal valves 116a, . . . , 116f, or both). Individual ones of the plurality of valves may be coupled to individual ones of the plurality of tank compartments 104a, . . . , 104f and may be operable to regulate a flow of liquid product into and out of the individual ones of the plurality of tank compartments 104a, . . . , 104f. Each of the valves may have a normally locked state. Computer readable and executable instructions, when executed by the processor, may cause the system controller 130 compare the shipping volume to a tank compartment volume or available volume of each of the plurality of tank compartments 104a, . . . , 104f. The system controller 130 may further maintain individual ones of the plurality of valves (e.g. , control valves 110a, . . . , 110f, internal valves 116a, . . . , 116f, or both) in the normally locked state based on the comparison of the shipping volume to the tank compartment volume or available volume in the corresponding tank compartment 104a, . . . , 104f to prevent the flow of liquid product into the corresponding tank compartment 104a, . . . , 104f. Additionally, the system controller 130 may be caused to transition individual ones of the plurality of valves from the normally locked state to an unlocked state based on the comparison of the shipping volume to the tank compartment volume or available volume in the corresponding tank compartment 104a, . . . , 104f, thereby allowing the flow of liquid product into the corresponding tank compartment 104a, . . . , 104f. Thus, for a product transport vehicle 102 having a plurality of different sized tank compartments 104a, . . . , 104f, the product delivery system 100 may be operable to maintain the valves in the locked position for those tank compartments 104, . . . , 104f having a tank compartment volume or available volume that is insufficient to receive the shipping volume or is substantially larger than the shipping volume in order to prevent or reduce overfill conditions or efficiency reductions that may result from fluidly coupling the wrong tank compartment 104a, . . . , 104f to the loading arm 502.

Referring to FIG. 5, the product delivery system 100 may additionally reduce errors in loading operations by preventing or reducing retain of liquid products in the tank compartments 104a, . . . , 104f. This may be accomplished by taking into consideration the destination volumes of one or more the distribution tanks 170a, 170b at a distribution station 172 to which the liquid products are to be delivered. The destination volume may refer to a volume in a distribution tank 170a, 170b that is available for receiving liquid product. In embodiments, the product delivery system 100 may receive a destination volume from the loading system 501, the fleet management system 520, the cloud system 530, and/or a distribution station control unit 171 at a distribution station 172. The product delivery system 100, in particular the system controller 130, may be operable to compare the shipping volume to the destination volume, the tank compartment volume of the tank compartment 104a, . . . , 104f, the available volume in the tank compartment 104a, . . . , 104f, or combinations of these. The product delivery system 100 may be operable to maintain the valve (e.g. , control valves 110a, . . . , 110f, internal valves 116a, . . . , 116f, or both) in the normally locked state based on the comparison of the shipping volume to the destination volume, the tank compartment volume, the available volume, or combinations of these to prevent the flow of the liquid product to be loaded into the tank compartment. The product delivery system 100 may be operable to transition the valve (e.g. , control valves 110a, . . . , 110f, internal valves 116a, . . . , 116f, or both) from the normally locked state to an unlocked state based on the comparison of the shipping volume to the destination volume, the tank compartment volume, the available volume, or combinations of these, thereby permitting the flow of the liquid product to be loaded into the tank compartment 104a, . . . , 104f.

The product delivery system 100 may be operable to display a message on the display 144 indicative of the result of the comparison between the tank compartment volume and/or available volume in the tank compartment 104a, . . . , 104f and the shipping volume and/or destination tank volume. In embodiments, the product delivery system 100 may display a message on the display 144 indicative of a condition in which the tank compartment 104, . . . , 104f does not have sufficient available volume to receive the amount of liquid product to be loaded. The product delivery system 100 may also be operable to display an indication that the available volume in the tank compartment 104, ..., 104*f* is sufficient to accommodate the volume of liquid product to be loaded. In embodiments, the product delivery system 100 may display a message on the display 144 indicative of a condition in which the destination tank does not have sufficient available volume to receive the amount of liquid product to be loaded in the tank compartment 104*a*, ..., 104*f*. The product delivery system 100 may also be operable to transmit a signal indicative of the result of the comparison between the tank compartment volume and/or available volume in the tank compartment 104*a*, ..., 104*f* and the shipping volume and/or destination tank volume to the loading system 501 at the loading station 500, the fleet management system 520, and/or the cloud system 530.

Additionally or alternatively, in embodiments, the product delivery system 100 may be operable to send a stop signal to the loading system 501 at the loading station 500. The stop signal may be operable to prevent or stop the loading process. For example, in embodiments, the product delivery system 100 may include an overfill detection system communicatively coupled to the system controller 130. The product delivery system 100 may include computer readable and executable instructions that, when executed by the processor, may cause the system controller 130 to transmit an overfill condition to the overfill detection system, wherein the overfill detection system may prevent the flow of loaded liquid product from the loading station 500 into the tank compartment 104*a*, ..., 104*f* based on the comparison of the shipping volume to the tank compartment volume or available volume in the tank compartment 104*a*, ..., 104*f*. In embodiments, each of the overfill sensors 210*a*, ..., 210*f* may be communicatively coupled to the system controller 130 through the communication path 149 and to the loading system 501 through socket 146. In these embodiments, the system controller 130 may compare the shipping volume to the tank compartment volume or the available volume and, if the shipping volume is too large or too small, the system controller 130 may send a signal through the level sensors 210*a*, ..., 210*f* indicating an overfill condition. This overfill condition signal may be conveyed to the loading system 501 at the loading station 500 through the socket 146 and may cause the loading system 501 to stop or prevent loading of the liquid product to the tank compartment 104*a*, ..., 104*f*. Thus, the overfill sensors 210*a*, .. , 210*f* and/or overfill detection system can be used as a backup system or redundant system for preventing loading of the tank compartments 104*a*, ..., 104*f* in the event of a mismatch between the shipping volume and the tank compartment volume or available volume.

Additionally, the product delivery system 100 may be operable to allow or disallow loading of a liquid product into one or more tank compartments 104*a*, ..., 104*f* if the system identifies a mismatch in the type of liquid product to be shipped compared to the type of liquid product being loaded, the type of liquid product already present in the tank compartment 104*a*, ..., 104*f* as retain, or previously loaded and delivered liquid products. As previously discussed, the product delivery system 100 may include the fluid property sensors 106*a*, ..., 106*f* coupled to the tank compartments 104*a*, ..., 104*f*, the control valve 110*a*, ..., 110*f*, or the internal valve 116*a*, ..., 116*f* and communicatively coupled to the system controller 130. The fluid property sensors 106*a*, ..., 106*f* may be operable to determine a transported liquid type of the liquid product in the tank compartment 104*a*, ..., 104*f*. The system controller 130 may receive a fluid property signal from the fluid property sensor 106*a*, ..., 106*f* indicative of the transported liquid type of the liquid product in the tank compartment 104*a*, ..., 104*f*. The fluid property signal may be indicative of one or more of a density, viscosity, dielectric constant, light transmissivity, fluorescent property, or combinations of these. The system controller 130 of the product delivery system 100 may be configured to determine the transported liquid type from the signal received from the fluid property sensor 106*a*, ..., 106*f* and/or from a transported liquid type parameter stored on the storage medium 134. In embodiments, signals from the fluid property sensor 106*a*, ..., 106*f* may be adjusted based on the temperature determined from temperature sensors 402*a*, ..., 402*f*. The system controller 130 of the product delivery system 100 may be configured to receive a shipping liquid type of the liquid product to be loaded into the tank compartment 104*a*, ..., 104*f*. As previously discussed, the product delivery system 100 may receive the shipping liquid type from the loading system 501 at the loading station 500, the fleet management system 520, and/or the cloud system 530. The product delivery system 100 may also be operable to receive a distribution liquid type of liquid product in a distribution tank 170*a*, 170*b* from the loading system 501, the fleet management system 520, the cloud system 530, and/or the distribution system control unit 171 at the distribution station 172.

The system controller 130 of the product delivery system 100 may be configured to compare the shipping liquid type to the transported liquid type and maintain the valve (e.g. , control valves 110*a*, ..., 110*f*, internal valves 116*a*, ..., 116*f*, or both) in the normally locked state when the shipping liquid type and the transported liquid type do not match to prevent the flow of the liquid product to be loaded into the tank compartment 104*a*, ..., 104*f*. Additionally, the system controller 130 of the product delivery system may be configured to transition the valve (e.g. , control valves 110*a*, ..., 110*f*, internal valves 116*a*, ..., 116*f*, or both) from the normally locked state to an unlocked state when shipping liquid type and the transported liquid type match based on the comparison of the shipping volume to the tank compartment volume, thereby permitting the flow of the liquid product to be loaded into the tank compartment 104*a*, ..., 104*f*. In embodiments, the system controller 130 of the product delivery system 100 may be configured to transmit an overfill condition to the overfill prevention system and/or the loading system 501 at the loading station when the shipping liquid type and the transported liquid type do not match. In response to the overfill condition signal, the overfill prevention system and/or the loading system 501 at the loading station 500 may stop the flow of liquid product from a liquid product loading station into the tank compartment 104*a*, ..., 104*f* when the loaded liquid type and the transported liquid type do not match.

Referring again to FIGS. 4 and 5, in embodiments, the product delivery system 100 may be configured to compare the type of liquid in the distribution tank 170*a*, 170 to which the liquid product is to be delivered to the shipping liquid type and/or the transported liquid type to make sure the correct liquid product is loaded for delivery. The system controller 130 of the product delivery system 100 may be configured to receive a distribution liquid type of the liquid product in a distribution tank 170*a*, 170*b* at a distribution station 172 from the loading system 501, the fleet management system 520, the cloud system 530, and/or from a distribution station control unit 171 at the distribution station 172 and to compare the shipping liquid type to the distribution liquid type, the transported liquid type, or both. The system controller 130 of the product delivery system 100 may be configured to maintain the valve (e.g. , control valves 110*a*, ..., 110*f*, internal valves 116*a*, ..., 116*f*, or both) in the normally locked state when the shipping liquid type, the transported liquid type, and the distribution liquid type do not match to prevent the flow of the liquid product to be loaded into the tank compartment 104*a*, ..., 104*f*. Additionally, the system controller 130 of the product delivery system 100 may be configured to transition the valve (e.g., control valves 110*a*, ..., 110*f*, internal valves 116*a*, ..., 116*f*, or both) from the normally locked state to an unlocked state when shipping liquid type, the transported liquid type, and the distribution liquid type all match based on the comparison of the shipping liquid volume to the tank compartment volume, thereby permitting the flow of the liquid product to be loaded into the tank compartment 104*a*, ..., 104*b*.

Referring to FIG. 4, once the tank compartment 104*a*, ..., 104*f* has been loaded, the loading system 501 may stop the flow of liquid product by stopping the pump 508 or closing one or more automated valves of the loading system 501. The operator of the product transport vehicle 102 may close the control valve 110*a*, ..., 110*f* corresponding to the tank compartment 104*a*, ..., 104*f*. The product delivery system 100 may be configured to close the internal valve 116*a*, ..., 116*f* corresponding to the tank compartment 104*a*, ..., 104*f* and return the control valve 110*a*, ..., 110*f*, the internal valve 116*a*, ..., 116*f*, or both, to the normally locked state in preparation for transport. The product delivery system 100 may store information relating to the loaded tank compartment 104*a*, ..., 104*f* in the storage medium 134. The operator may also disconnect the loading arm 502 from the product transport vehicle 102 and/or disconnect any loading hoses. The operator may input one or more pieces of information, such as transported liquid type, amount loaded, etc., into the product delivery system 100 using the user input device 138. When all the tank compartments 104*a*, ..., 104*f* have been loaded, the operator may also disconnect the socket 146 from the loading system. Other steps customarily associated with concluding loading of liquid products into the tank compartments 104*a*, ..., 104*f* are also contemplated.

The product delivery system 100 may be configured to display one or more parameters relating to the loading process on the display 144. The product delivery system 100 may be configured to display one or more of the shipping liquid type, transported liquid type, shipping volume, tank compartment volume, available volume, loaded volume, retain volume, or other information. In embodiments, the computer readable and executable instructions, when executed by the processor, may cause the system controller 130 of the product delivery system 100 to indicate on the display 144 at least one of the shipping liquid type and the transported liquid type of the liquid product in the tank compartment 104*a*, ..., 104*f*. The product delivery system 100 may be configured to display one or more messages on the display 144, such as messages or warnings relating to potential liquid product mismatches, potential overfill or under fill conditions, presence of retain liquid product, or other warnings or messages.

In embodiments, the product delivery system 100 may further include one or a plurality of product grade indicator (PGI) controllers communicatively coupled to the system controller 130. The PGI controller may include display. The computer readable and executable instructions, when executed by the processor 132, further cause the system controller 130 of the product delivery system 100 to display the shipping liquid type on the PGI controller when the shipping liquid type and the transported liquid type match and display the transported liquid type on the PGI controller when the shipping liquid type and the transported liquid type do not match.

Referring again to FIG. 5, the product delivery system 100 may also be configured to transmit information to the loading system 501 at the loading station 500, the fleet management system 520, a cloud system 530, or combinations of these by way of the network 600. For example, referring to FIG. 4, the product delivery system 100 may be configured to transmit information to the loading system 501 through the hardwired communication path provide by the socket 146 and cable 512. Referring again to FIG. 5, the product delivery system 100 may also be configured to transmit information wirelessly to the loading system 501, the fleet management system 520, the cloud system 530, or combinations of these. The product delivery system 100 may transmit information relating to the performance of the product transport vehicle 102 and product delivery system 100, the type and amount of material loaded into or retained in each of the tank compartments 104*a*, ..., 104*f*, the temperature of the liquid products in the tank compartments 104*a*, ..., 104*f*, or combinations of this information. In embodiments, the product delivery system 100 may additionally be operable to download software updates to the system controller 130 through communication with the network 600 via the network interface device 136. This may enable software updates for the system controller 130 to be transmitted from the fleet management system 520, the cloud system, or both to the system controller 130 to remotely update the system/software.

Referring to FIG. 4, in embodiments, the product delivery system 100 may be operable to determine one or more loading performance metrics for the product delivery system 100 and transmit the one or more loading performance metrics to the loading system 501 at the loading station 500, the fleet management system 520, and/or the cloud system 530. The loading performance metrics may be related to the loading of the tank compartments 104*a*, ..., 104*f* at the loading station 500. The loading performance metrics may be determined by the product delivery system 100 based on information contained in the event log stored in the storage medium 134. As previously discussed, the even log may contain information on the control signals sent and signals received by the system controller 130 and the time stamp information for those signals, the time stamp information including the date and time of the occurrence of each event. Loading performance metrics may include, but are not limited to, a loading setup time, a loading transition time, a tank compartment loading time, a total loading time, other loading performance metric, or combinations of these.

The loading setup time may be indicative of a time elapsed between arrival of the product transport vehicle 102 at the loading station 500 and a time at which fluid flow into the tank compartment 104*a*, ..., 104*f* is detected. The loading transition time may be indicative of a time elapsed to transition from loading one tank compartment to loading a second tank compartment. For example, the loading transition time may be indicative of the time elapsed between the cessation of flow into the first tank compartment 104*a*, for example, and the beginning of flow of liquid product into the second tank compartment 104*b*. The tank compartment loading time for each tank compartment 104*a*, ..., 104*f* may be indicative of the time to complete loading of the tank compartment 104*a*, ..., 104*f*. For example, in embodiments, the tank compartment loading time may be the time elapsed between the beginning of flow of liquid product into the tank compartment 104*a*, ..., 104*f* and the final cessation of flow of liquid product into the same tank compartment 104a, ..., 104f. The tank compartment loading time may also be indicative of a time between when the control valve 110a, ..., 110f and/or internal valve 116a, 116f for a tank compartment 104a, ..., 104f is opened and when the valve is closed. The total loading time may be indicative of a total time required to load all of the tank compartments 104a, ..., 104b of the product transport vehicle 102. A total time at the loading station 500 may be indicative of the total time the product transport vehicle 102 is at the loading station 500, which may be the time between when the product transport vehicle 102 arrives and when the product transport vehicle 102 departs from the loading station 500. Other loading performance metrics based on one or more events during operation of the product delivery system 100 during loading of the product transport vehicle 102 are contemplated. The loading performance metrics maybe useful for identifying equipment, such as pumps, valves, sensors, or other equipment, that is not functioning properly or to identify opportunities to improve the loading process.

Referring to FIG. 5, the product delivery system 100 may be operable to determine one or more delivery performance metrics for the product delivery system 100 and transmit the one or more delivery performance metrics to the fleet management system 520 and/or the cloud system 530. Additionally or alternatively, in embodiments, the product delivery system 100 may be operable to transmit the one or more delivery performance metrics to the loading system 501 at the loading station 500, such as during the next time the product transport vehicle 102 arrives at the loading station 500. For example, in embodiments, the executable instructions, when executed by the processor, may cause the system controller to automatically determine one or more delivery performance metrics for the product transport vehicle 102 and transmit the one or more unloading performance metrics to the fleet management system 520, to the loading system 501 at the loading station 500, and/or to the cloud system 530. The delivery performance metrics may be related to the delivery or transfer of the liquid product from the tank compartments 104a, ..., 104f of the product transport vehicle 102 into one or more distribution tanks 170a, 170b at a distribution station 172. The delivery performance metrics may be determined by the product delivery system 100 based on information contained in the event log stored in the storage medium 134. As previously discussed, the even log may contain information on the control signals sent and signals received by the system controller 130 and the time stamp information for those signals. Delivery performance metrics may include, but are not limited to, an unloading setup time, an unloading transition time, a tank compartment unloading time, a total unloading time, a total site time, other delivery performance metrics, or combinations of these.

The unloading setup time may be indicative of a time elapsed between arrival of the product transport vehicle 102 at the distribution station 172 and a time at which fluid flow from the tank compartment 104a, ..., 104f to a distribution tank 170a, 170b at the distribution station 172 is detected. The unloading transition time may be indicative of a time required to transition from unloading from one tank compartment to unloading a second tank compartment. For example, the unloading transition time may be indicative of the time elapsed between the cessation of flow out of the first tank compartment 104a, for example, and the beginning of flow of liquid product out of the second tank compartment 104b. The tank compartment unloading time for each tank compartment 104a, ..., 104f may be indicative of the time to complete unloading of the tank compartment 104a, ..., 104f. For example, in embodiments, the tank compartment unloading time may be the time elapsed between the beginning of flow of liquid product out of the tank compartment 104a, ..., 104f and into the distribution tank 170a, 170b and the final cessation of flow of liquid product out of the same tank compartment 104a, ..., 104f. The tank compartment unloading time may also be indicative of a time between when the control valve 110a, ..., 110f and/or internal valve 116a, 116f for a tank compartment 104a, ..., 104f is opened and when the same valve(s) are closed. The total unloading time may be indicative of a total time required to unload all of the tank compartments 104a, ..., 104b of the product transport vehicle 102. The total site time may be indicative of the total time the product transport vehicle 102 is at the distribution station 172, which may be the time between when the product transport vehicle 102 arrives and when the product transport vehicle 102 departs from the distribution station 172. Other delivery performance metrics based on one or more events during operation of the product delivery system 100 during unloading of the product transport vehicle 102 are contemplated. The delivery performance metrics maybe useful for identifying equipment, such as pumps, valves, sensors, or other equipment, that is not functioning properly or to identify opportunities to improve the efficiency of the delivery process.

The product delivery system 100 may be operable to store the loading performance metrics and/or delivery performance metrics on the storage medium 134. Additionally, in embodiments, the product delivery system 100 may be operable display one or more of the loading performance metrics and/or delivery performance metrics on the display 144. As previously discussed, the product delivery system 100 may be operable to transmit one or more of the loading performance metrics and/or delivery performance metrics to the loading system 501 at the loading station 500, to the fleet management system 520, and/or to the cloud system 530.

In embodiments, the product delivery system 100 may also be operable to determine the retain amount of retain liquid product retained in each of the tank compartments 104a, ..., 104f. The product delivery system 100 may be operable to save the retain amount in the storage medium 134. Additionally, in embodiments, the product delivery system 100 may be operable to transmit the retain amount of retained liquid product in each tank compartment 104a, ..., 104f to the fleet management system 520, the cloud system 530, and/or to the loading system 501 at the loading station 500. The retain amount may be used by the fleet management system 520, the cloud system 530, and/or the loading system 501 to automatically recalculate the shipping volume or loading volume of liquid product to be loaded into the tank compartments 104a, ..., 104f the next time the product transport vehicle 102 arrives at the loading station 500.

The product delivery system 100 may also be operable to monitor information relating to the movement of the product transport vehicle 102, such as GPS location, speed, acceleration, idle time, or other parameter. The product delivery system 100 may store this information in the storage medium 134 and/or may be operable to transmit the information to the fleet management system 520, the cloud system 530, and/or the loading system 501 at the loading station.

Referring to FIG. 1, in embodiments, the product delivery system 100 may be operable to control a temperature of one or more of the tank compartments 104a, ..., 104f. The product delivery system 100 may be operable to receive temperature information for one or more liquid products from the loading system 501 at the loading station 500, from the fleet management system 520, and/or from the cloud system 530. The temperature information for a particular liquid product may include, but is not limited to a target transport temperature, a high temperature limit, a low temperature limit, other temperature associated with the particular liquid product, or combinations of these temperatures. The system controller 130 of the product delivery system 100 may save the temperature information received from the loading system 501, fleet management system 520, and/or cloud system 530 in the storage medium 134.

The product delivery system 100 may use the temperature information for the liquid products to control the temperature of the liquid products in the tank compartments 104a, ..., 104f during transportation of the liquid products between the loading station 500 and the distribution tanks 170a, 170b at a distribution station 172. The product delivery system 100 may continuously, semi-continuously, or periodically measure a temperature in each of the tank compartments 104a, ..., 104f using the temperature sensors 402a, ..., 402f. Each of the temperature sensors 402a, ..., 402f may be operable to transmit a temperature signal to the system controller 130 indicative of a temperature of the liquid product in the tank compartment 104a, ..., 104f. The system controller 130 may be configured to receive the temperature signal and save a value of the temperature of the liquid product in the tank compartment 104a, ..., 104f in the storage medium 134.

Additionally, in embodiments, the system controller 130 of the product delivery system 100 may include machine readable instructions that, when executed by the processor 132, may cause the system controller 130 to compare a temperature of the liquid product in the tank compartment 104a, ..., 104f to the temperature information received from the loading station 501, fleet management system 520, and/or cloud system 530, which may be saved in the storage medium 134. The instructions may cause the system controller 130 to adjust a temperature of the liquid product in the tank compartment 104a, ..., 104f based on the comparison of the temperature of the liquid product to the temperature information. The temperature of the liquid product may be adjusted by sending a control signal to a heat exchanger to increase or decrease an amount of heat transferred into the tank compartment 104a, ..., 104f and/or liquid product contained therein. The system controller 130 may be operable to transmit an alarm signal indicative of a temperature alarm condition (high temperature or low temperature condition) to the display 144, or the speaker 142. The display 144 and/or speaker 142 may display or broadcast an alarm in response to the alarm signal to alert the operator of a temperature condition. As previously discussed, temperature monitoring and control systems for product transport vehicles are described in U.S. Pat. No. 9,715,241, Jul. 25, 2017, entitled "Temperature Monitoring and Control Apparatus and Method," the entirety of which is incorporated herein by reference.

In embodiments, the product delivery system 100 may be operable to transmit temperature information for one or more of the tank compartments 104a, ..., 104f to the loading station 501, to the fleet management system 520, and/or to the cloud system 530. In embodiments, the product delivery system 100 may be operable to transmit temperatures for each of the tank compartments 104a, ..., 104f to the fleet management system 520 and/or the cloud system 530. The fleet management system 520 and/or the cloud system 530 may maintain records of the temperature of the liquid products during transit and may be operable to display real time temperature information, which can be remotely monitored from the fleet management system 520 or the cloud system 530 during transit of the liquid product. In some embodiment, the product delivery system 100 may be operable to transmit one or more temperature alarm signals indicative of an out-of-specification temperature condition of the liquid product to the loading system 501, fleet management system 520, and/or cloud system 530. Thus, the product transport vehicle 102 can be remotely monitored for out-of-specification temperature conditions. In embodiments, the product delivery system 100 may save information on out-of-specification temperature conditions in the storage medium 134. For example, temperature alarm signals indicative of an out-of-specification temperature condition may be saved and maintained in the event log for the product transport vehicle 102. The temperature alarm information may be retrieved from the event log, such as by downloading the temperature alarm information, displaying the temperature alarm information on the display 144, or other. The product delivery system 100 may be operable to display the temperature information for each tank compartment 104a, ..., 104f on the display 144.

Referring again to FIG. 5, in embodiments, the product delivery system 100 may include the product transport vehicle 102 and the cloud system 530, which may be disposed at a location remote from the product transport vehicle 102. The product transport vehicle 102 may have any of the features previously discussed herein for the product transport vehicle 102. In particular, as previously discussed, the product transport vehicle 102 may include at least one at least one tank compartment 104a, ..., 104f for containing a liquid product, at least at least one valve coupled to the tank compartment 104a, ..., 104f, the valve may be positioned to regulate a flow of the liquid product into and out of the tank compartment 104a, ..., 104f, and having a normally locked state. The valve may be the control valve 110a, ..., 110f or control valve 116a, ..., 116f associated with the tank compartment. The product transport vehicle 102 may include the network interface device 136 operable to establish a communication path with one or more external systems, such as the fleet management system 520 or cloud system 530. The system controller 130 of the product transport vehicle 102 may be communicatively coupled to the valve and the network interface device 136. The system controller 130 may include computer readable and executable instructions that, when executed by the processor, may cause the system controller to receive one or more signals indicative of one or more events, alarms, or errors from one or more instruments coupled to the product transport vehicle and transmit one or more of the signals to the cloud system via the network interface device. The instruments may include one or more of the plurality of fluid property sensors 106a, ..., 106f, the plurality of temperature sensors 402a, ..., 402e, the plurality of pressure sensors 108a, ..., 108f, the plurality of control valves 110a, ..., 110f, plurality of locking mechanisms, plurality of control valve sensors 112a, ..., 112f, the plurality of hose tag readers 114a, ..., 114f, the main air valve 204, the plurality of solenoid valves 120a, ..., 120f, the plurality of solenoid valve sensors 122a, ..., 122f, the plurality of overfill sensors 210a, ..., 210f, the user input device 138, the microphone, 140, the speaker 142, the display 144, the electrical connector 146, or combinations of these.

The cloud system 530 may be operable to communication with the system controller 130 and/or network interface device of the product transport vehicle 102 via the network 600. The cloud system 430 may include at least one cloud system processor and at least one cloud system storage medium containing cloud system computer readable and executable instructions that, when executed by the cloud system processor, may cause the cloud system 530 to receive the one or more signals indicative of one or more events, alarms, or errors from the network interface device 136; process the one or more signals; and determine a condition of the product transport vehicle 102 based on processing the one or more signals. Processing the one or more signals may comprise stitching together one or more events, alarms, or errors indicated by the one or more signals received by the cloud system 530 based at least in part on the time stamp and GPS information associated with the one or more signals. The conditions of the product transport vehicle 102 may include loading, unloading, in transit, parked, under maintenance, or other conditions. The cloud system computer readable and executable instructions, when executed by the cloud system processor, may cause the cloud system 530 to store events, alarms, and errors in an event log on the at least one cloud system storage medium.

In embodiments, the cloud system 530 may include a user interface capable of being accessed from a remote location, such as but not limited to a web portal accessible via the Internet. The user interface may be operable to monitor operation and conditions of the product transport vehicle 102 through the cloud system 530. The cloud system computer readable and executable instructions, when executed by the cloud system processor, cause the cloud system 530 to display one or more conditions of the product delivery vehicle 102 on the user interface. The conditions of the product transport vehicle may include, but are not limited to loading, unloading, in-transit, parked, under maintenance, or other condition. The cloud system 530 may also be operable to display to the user interface one or more variables associates with the product transport vehicle 102, such as but not limited to liquid type contained in each tank compartment 104a, . . . , 104f ; the temperature, pressure, or fluid property sensor readings; the position of one or more of the control valves 110a, . . . , 110f, solenoids, main air valve, etc.; the speed, acceleration, and/or GPS location of the trailer; alarms received from the system controller 130; errors received from the system controller 130, or any other information gathered by or transmitted from the system controller 130 as previously disclosed herein. The cloud system 530 may be operable to track events of the product transport vehicle 102 and co-relate the events to determine the status of the product transport vehicle 102. In embodiments, the cloud system 530 may correlate the events, alarms, and errors with GPS information for the product transport vehicle 102 to identify if events, alarms, or errors are meaningful.

In embodiments, the cloud system computer readable and executable instructions, when executed by the cloud system processor, may cause the cloud system 530 to receive temperature information for each tank compartment 104a, . . . , 104f of the product transport vehicle 102, and display the temperature information for each tank compartment 104a, . . . , 104f of the product transport vehicle 102 on the user interface. The cloud system 530 may also be operable to display temperature alarms, such as high temperature alarms or low temperature alarms, received from the system controller 130.

In embodiments, the product delivery system 100 may be operable to allow the product transport vehicle 102 to load or unload liquid products within a specified geographical region or area. As used herein, the term "geofenced region" may refer to a geographical area based on GPS location information and may define an allowed area for a product transport vehicle 102. The cloud system 530 and/or the fleet management system 520 may be operable to obtain geographical location information for one more loading stations 500, distribution stations 170, or both and define a geofencing region for the product transport vehicle 102 based on the geographical location information obtained. The geographical location information may be obtained through communication, through the network 160, with loading systems 509 at one or more loading stations 500 or from one or more distribution station control units 171 and a distribution station 170. In embodiments, the geographical location information may be stored in the one or more of the cloud system storage medium and accessed by the cloud system 530 for determining the geofencing region. The geographical location information may also be stored on the fleet management system 520. The geofencing region, once determined, may be saved on one or more of the cloud system storage media, on a storage medium associated with the fleet management system 520, or both. The geofencing region information may also be pushed out to the system controller 130 through wireless communication through the network 160.

The system controller 130, by way of the network interface device 136, may be operable to receive or retrieve the geofencing region information from the fleet management system 520 and/or the cloud system 530. The system controller 130 may include computer readable and executable instructions that, when executed by the processor, may cause the system controller 130 to receive the geofencing region from the cloud system 530 and/or the fleet management system 520, compare the GPS location of the product transport vehicle 102 with the geofencing region, and maintain the at least one valve (e.g. , control valve 110 or internal valve 116) in the normally locked state based on the comparison of the GPS location of the product transport vehicle 102 to the geofencing region to prevent the flow of the liquid product into or out of the tank compartments 104a, . . . , 104f when the product transport vehicle 102 is outside of the geofencing region (e.g. , not within the geofencing region). In embodiments, the computer readable and executable instructions, when executed by the processor, may cause the system controller 130 to allow the at least one valve to transition from the normally locked state to the unlocked state when all of the other preconditions are satisfied (e.g. , one or more of liquid types match, volumes match, main air on, vehicle stopped, hoses connected, electrical connector connected, etc.) and the product delivery vehicle 102 is located within the geofencing region.

Referring to FIGS. 3-5, a method for loading a liquid product into a tank compartment 104a, . . . , 104f of a product transport vehicle 102 can include the steps of fluidly coupling the tank compartment 104a, . . . , 104f of the product transport vehicle 102 to a loading arm 502 or transfer line at a loading station 500. The tank compartment 104a, . . . , 104f may include a valve (e.g. , internal valve 116a, . . . , 116f and/or a control valve 110a, . . . , 110f) that can regulate a flow of liquid product into the tank compartment 104a, . . . , 104f and having a normally locked state. The method may further include establishing a communication path 149 between the system controller 130 of the product transport vehicle 102 and a loading system 501 at the loading station 500. The method may include receiving a shipping volume from the loading system 501, where the shipping volume is the volume of liquid product scheduled to be loaded into the tank compartment 104a, . . . , 104f. The method may include comparing the shipping volume to a tank compartment volume of the tank compartment 104a, ..., 104f, where the tank compartment volume is stored in the storage medium or determined from a signal received from a level sensor, such as pressure sensors 108a, ..., 108f. The method may include maintaining the valve (e.g., internal valve 116a, ..., 116f and/or control valve 110a, ..., 110f) in the normally locked state based on the comparison of the shipping volume and the tank compartment volume to prevent the flow of liquid product into the tank compartment 104a, ..., 104f. The method may further include transitioning the valve (internal valve 116a, ..., 116f and/or control valve 110a, ..., 110f) from the normally locked state to an unlocked state based on the comparison of the shipping volume and the tank compartment volume, thereby permitting the flow of liquid product into the tank compartment 104a, ..., 104f.

In embodiments, the method for loading a liquid product into a tank compartment 104a, ..., 104f of a product transport vehicle 102 can further include the steps of maintaining the valve (e.g., internal valve 116a, 116f and/or control valve 110a, ..., 110f) in the normally locked state when the shipping volume and the tank compartment volume differ by less than a threshold amount to prevent the flow of the liquid product to be loaded into the tank compartment 104a, ..., 104f, and transitioning the valve (e.g., internal valve 116a, 116f and/or control valve 110a, ..., 110f) from the normally locked state to an unlocked state when the shipping volume and the tank compartment volume differ by more than the threshold amount thereby permitting the flow of the liquid product to be loaded into the tank compartment 104a, ..., 104f.

In embodiments, the method for loading a liquid product into a tank compartment 104a, ..., 104f of a product transport vehicle 102 can further include the steps of receiving a fluid type signal from a fluid property sensor 106a, ..., 106f fluidly coupled to the tank compartment 104a, ..., 104f, the fluid type signal indicative of a transported liquid type of a liquid product in the tank compartment 104a, ..., 104f. The fluid type signal may be indicative of one or more of the density, viscosity, dielectric constant, light transmissivity, fluorescent property of the transported liquid. The fluid type signal may be adjusted based on the temperature of the fluid as determined from the temperature signal received from the temperature sensor 402a, ..., 402f. The method may further include determining the transported liquid type from the fluid type signal received from the fluid property sensor 106a, ..., 106f, receiving a shipping liquid type of the liquid product to be loaded in the tank compartment 104a, ..., 104f, and comparing the shipping liquid type to the transported liquid type. The method may further include maintaining the valve (e.g., internal valve 116a, 116f and/or control valve 110a, ..., 110f) in the normally locked state when the shipping liquid type and the transported liquid type do not match to prevent the flow of liquid product into the tank compartment 104a, ..., 104f and transitioning the valve (e.g., internal valve 116a, 116f and/or control valve 110a, ..., 110f) from the normally locked state to an unlocked state when the shipping liquid type and the transported liquid type match and when the shipping volume and the tank compartment volume differ by less than the threshold amount, thereby permitting the flow of liquid product into the tank compartment 104a, ..., 104f.

In embodiments, the method for loading a liquid product into a tank compartment 104a, ..., 104f of a product transport vehicle 102 can further include the steps of sensing an amount of liquid product present in the tank compartment 104a, ..., 104f with a pressure sensor 108a, ..., 108f positioned in the tank compartment 104a, ..., 104f, transmitting a pressure signal to the system controller 130 indicative of the sensed amount of liquid product present in the tank compartment 104a, ..., 104f, and determining a retained volume of liquid product in the tank compartment 104a, ..., 104f from the pressure signal. The method may further include calculating an available volume in the tank compartment 104a, ..., 104f by subtracting the retained volume from the tank compartment volume and comparing the available volume in the tank compartment 104a, ..., 104f to the shipping volume. The method may further include maintaining the valve (e.g., internal valve 116a, 116f and/or control valve 110a, ..., 110f) in the normally locked state based on the comparison of the shipping volume and the available volume in the tank compartment 104a, ..., 104f to prevent the flow of liquid product into the tank compartment 104a, ..., 104f and transitioning the valve (e.g., internal valve 116a, 116f and/or control valve 110a, ..., 110f) from the normally locked state to an unlocked state based on the comparison of the shipping volume and the available volume in the tank compartment 104a, ..., 104f, thereby permitting the flow of liquid product into the tank compartment 104a, ..., 104f. In embodiments, the method may include receiving a signal indicative of a retained liquid product in one or more tank compartments 104a, ..., 104f from the pressure sensor 108a, ..., 108f, the FPS 106a, ..., 106f, or both and maintaining the valve (e.g., internal valve 116a, 116f and/or control valve 110a, ..., 110f) in the normally locked when the signal indicates that the tank compartment 104a, ..., 104f contains retained liquid product.

In embodiments, the method for loading a liquid product into a tank compartment 104a, ..., 104f of a product transport vehicle 102 can further include the steps of sensing an overfill condition of liquid product within the tank compartment 104a, ..., 104f with a point level sensor 108a, ..., 108f positioned in the tank compartment 104a, ..., 104f, and transmitting a point signal to the system controller 130 indicating whether there is an overfill condition of liquid product within the tank compartment 104a, ..., 104f.

In embodiments, the product delivery system 100 can include a product transport vehicle 102 comprising a tank compartment 104a, ..., 104f for containing a liquid product. A valve (e.g., internal valve 116a, 116f and/or control valve 110a, ..., 110f) can be coupled to the tank compartment 104a, ..., 104f to regulate a flow of the liquid product into the tank compartment 104a, ..., 104f. The valve (e.g., internal valve 116a, 116f and/or control valve 110a, ..., 110f) may have a normally locked state. A network interface device 136 can be operable to establish a communication path 149 with one or more external systems, such as a fleet management system 520, cloud system 530, and/or a loading system 501 at a loading station 500. A system controller 130 can be communicatively coupled to the valve (e.g., internal valve 116a, 116f and/or control valve 110a, ..., 110f) and the network interface device 136, the system controller 130 including a processor 132 and a storage medium 134 containing computer readable and executable instructions. When executed by the processor, the computer readable and executable instructions may cause the system controller 130 to automatically establish a communication path 149 between the network interface device 136 and a loading system 501 at a loading station 500, the fleet management system 520, and/or the cloud system 530, receive a shipping volume from the loading system 501, the fleet management system 520, and/or the cloud system 530, wherein the shipping volume is a volume of a liquid product scheduled to be loaded into the tank compartment 104, receive a destination volume from the loading system 501, the fleet management system 520, and/or the cloud system 530, where the destination volume is an available volume in a distribution tank 170a, 170b at a distribution station 172 to which the liquid product is to be delivered, and compare the shipping volume to the destination volume. After the comparison, the system controller can maintain the valve (e.g., internal valve 116a, 116f and/or control valve 110a, ..., 110f) in the normally locked state based on the comparison of the shipping volume to the destination volume to prevent the flow of the liquid product to be loaded into the tank compartment 104a, ..., 104f, and transition the valve (e.g., internal valve 116a, 116f and/or control valve 110a, ..., 110f) from the normally locked state to an unlocked state based on the comparison of the shipping volume and the tank compartment volume, thereby permitting the flow of the liquid product to be loaded into the tank compartment 104a, ..., 104f. The product delivery system 100 may additionally include any of the other features, characteristics, or properties previously discussed herein for the product delivery system 100.

This method and system of comparing volumes prior to loading includes some key benefits that the traditional systems do not have. These include preventing errors in record keeping of product inventory and delivery amounts, while also improving the tank compartment utilization and efficiency. Unlike traditional overfill systems, the comparison system always knows how much of each product exists in each location. This way, the system does not have to be reactive, such as an overfill detection sensor in the tank compartment, but can anticipate how much product needs to be placed into each tank to maximize the utilization. The system also has the benefit of being able to communicate with all the stages of the delivery process to ensure utilization is at its maximum. By comparing the volume to be delivered, to the volume available within the tank compartment, tank compartment utilization can be significantly improved. Prior to loading, the system makes sure the tank compartments that are selected for loading are a good fit for the volume intended to be shipped so that empty space is not shipped, which is an inefficient process.

Additionally, errors in the accounting system can be reduced due to the fact that the volume of the tank compartment, distribution tanks, and order volume are all checked against each other. Also, the system itself will prevent any miscalculations from occurring by preventing the filing of the tank compartments until it can ensure the correct volume of liquid product will fit in both the tank compartment and distribution tanks, and will adjust the shipping volume in the fleet management system if needed.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A product delivery system for a product transport vehicle, comprising:
    a product transport vehicle comprising a tank compartment for containing a liquid product;
    a valve coupled to the tank compartment, the valve regulating a flow of the liquid product into the tank compartment and having a normally locked state;
    a network interface device operable to establish a communication path with one or more external systems;
    a system controller communicatively coupled to the valve and the network interface device, the system controller comprising a processor and a storage medium containing computer readable and executable instructions which, when executed by the processor, cause the system controller to automatically:
        establish a communication path between the network interface device and a loading system at a loading station, a fleet management system, a cloud system, or combinations of these;
        receive a shipping volume from the loading system, the fleet management system, or the cloud system, wherein the shipping volume is a volume of a liquid product scheduled to be loaded into the tank compartment;
        compare the shipping volume to a tank compartment volume of the tank compartment, wherein the tank compartment volume is a total volume of the tank compartment and the tank compartment volume is stored in the storage medium;
        maintain the valve in the normally locked state based on the comparison of the shipping volume and the tank compartment volume to prevent the flow of the liquid product to be loaded into the tank compartment; and
        transition the valve from the normally locked state to an unlocked state based on the comparison of the shipping volume and the tank compartment volume, thereby permitting the flow of the liquid product to be loaded into the tank compartment.

2. The product delivery system of claim 1, wherein the computer readable and executable instructions, when executed by the processor, further cause the system controller to:
    maintain the valve in the normally locked state when the shipping volume and the tank compartment volume differ by greater than or equal to a threshold amount, a threshold percentage of the tank compartment volume, or both to prevent the flow of the liquid product to be loaded into the tank compartment; and
    transition the valve from the normally locked state to an unlocked state when the shipping volume and the tank compartment volume differ by less than the threshold amount, the threshold percentage, or both thereby permitting the flow of the liquid product to be loaded into the tank compartment.

3. The product delivery system of claim 1, wherein the executable instructions, when executed by the processor, cause the system controller to automatically:
    receive a destination volume from the loading system, the fleet management system, the cloud system, or a distribution station control unit at a distribution station, wherein the destination volume is an available volume in a distribution tank at a distribution station to which the product is to be delivered;
    compare the shipping volume to the destination volume, the tank compartment volume of the tank compartment, or both;
    maintain the valve in the normally locked state based on the comparison of the shipping volume to the destination volume, the tank compartment volume, or both to prevent the flow of the liquid product to be loaded into the tank compartment; and
    transition the valve from the normally locked state to an unlocked state based on the comparison of the shipping volume to the destination volume, the tank compartment volume, or both, thereby permitting the flow of the liquid product to be loaded into the tank compartment.

4. The product delivery system of claim 1, further comprising a fluid property sensor coupled to the tank compartment or the valve and communicatively coupled to the system controller, the fluid property sensor operable to determine a transported liquid type of the liquid product in the tank compartment from one or more of a density, viscosity, dielectric constant, light transmissivity, fluorescent property, or combinations of these, which are measured by the fluid property sensor.

5. The product delivery system of claim 4, wherein the computer readable and executable instructions, when executed by the processor, further cause the system controller to:
  receive a fluid property signal from the fluid property sensor indicative of the transported liquid type of the liquid product in the tank compartment;
  determine the transported liquid type from the signal received from the fluid property sensor or from a transported liquid type parameter stored on the storage medium;
  receive a shipping liquid type of the liquid product to be loaded into the tank compartment;
  compare the shipping liquid type to the transported liquid type;
  maintain the valve in the normally locked state when the shipping liquid type and the transported liquid type do not match to prevent the flow of the liquid product to be loaded into the tank compartment; and
  transition the valve from the normally locked state to an unlocked state when shipping liquid type and the transported liquid type match and based on the comparison of the shipping volume to the tank compartment volume, thereby permitting the flow of the liquid product to be loaded into the tank compartment.

6. The product delivery system of claim 4, further comprising an overfill detection system communicatively coupled to the system controller, wherein the computer readable and executable instructions, when executed by the processor, further cause the system controller to transmit an overfill condition to the overfill detection system, wherein the overfill detection system stops the flow of loaded liquid product from a liquid product loading station into the tank compartment when the loaded liquid type and the transported liquid type do not match.

7. The product delivery system of claim 4, wherein the computer readable and executable instructions, when executed by the processor, cause the system controller to automatically:
  receive a signal from the fluid property sensor, a pressure sensor, or both indicative of retained liquid product present in the tank compartment; and
  maintain the valve in the normally locked state when tank compartment contains retained liquid product as indicated by the signal.

8. The product delivery system of claim 1, further comprising a plurality of temperature sensors, each of the plurality of temperature sensors in contact with an interior surface of one of the tank compartments, wherein the computer readable and executable instructions, when executed by the processor, cause the system controller to:
  receive a temperature signal from one of the temperature sensors, the temperature signal indicative of a temperature of the liquid product in the tank compartment; and
  transmit the temperature signal indicative of the temperature of the liquid product in the tank compartment to the loading system, the fleet management system, the cloud system, or both.

9. The product delivery system of claim 8, wherein the computer readable and executable instructions, when executed by the processor, cause the system controller to:
  receive temperature information for each liquid product in each tank compartments from the fleet management system, cloud system, or loading system at the loading station;
  compare the measured temperature in each of the tank compartments to the temperature information received for each of the liquid products in the tank compartments; and
  control a temperature of the tank compartments based on the comparison.

10. The product delivery system of claim 1, further comprising a level sensor coupled to the tank compartment and operable to transmit a level signal to the system controller indicating an amount of liquid product present in the tank compartment, wherein the computer readable and executable instructions, when executed by the processor, further cause the system controller to:
  receive the level signal from the level sensor indicative of the amount of the liquid product retained in the tank compartment;
  determine a retained volume of liquid product retained in the tank compartment;
  calculate an available volume of the tank compartment from the retained volume of liquid product retained in the tank compartment and the tank compartment volume stored in the storage medium;
  compare the available volume of the tank compartment to the shipping volume;
  maintain the valve in the normally locked state based on the comparison of the shipping volume to the available volume of the tank compartment to prevent the flow of the liquid product to be loaded into the tank compartment; and
  transition the valve from the normally locked state to an unlocked state based on the comparison of the shipping volume to the available volume of the tank compartment, thereby permitting the flow of the liquid product to be loaded into the tank compartment.

11. The product delivery system of claim 1, further comprising an electrical socket operable to communicatively couple the system controller to the loading system at the loading station, wherein the computer readable and executable instructions, when executed by the processor, further cause the system controller to: determine that the electrical socket is coupled to the loading system at the loading station before establishing the communication path between the network interface device and the loading system.

12. The product delivery system of claim 1, wherein the computer readable and executable instructions, when executed by the processor, cause the system controller to automatically:
  determine one or more loading performance metrics, delivery performance metrics, or both for the product delivery system; and
  transmit the one or more loading performance metrics, the one or more delivery performance metrics or both to the loading system at the loading station, the fleet management system, the cloud system, or combinations of these;

wherein:
the loading performance metrics include one or more of a loading setup time indicative of a time between arrival of the product transport vehicle at the loading station and a time at which fluid flow into the tank compartment is detected; a loading transition time indicative of a time elapsed during to transition from loading a first tank compartment to loading a second tank compartment; a tank compartment loading time for each tank compartment indicative of the time elapsed to complete loading of the tank compartment; or a total loading time indicative of a total time elapsed to load all of the tank compartments of the product transport vehicle; and the delivery performance metrics include one or more of an unloading setup time indicative of a time between arrival of the product transport vehicle at the distribution station and a time at which fluid flow from the tank compartment to a distribution tank at the distribution station is detected;

an unloading transition time indicative of a time elapsed to transition from unloading from a first tank compartment to unloading from a second tank compartment; a tank compartment unloading time for each tank compartment indicative of the time elapsed to complete unloading of the tank compartment; a total unloading time indicative of a total time between commencing unloading of the first tank compartment to conclusion of unloading of a last tank compartment; or a total site time indicative of a total time between arrival of the product transport vehicle at the distribution station and departure of the product transport vehicle from the distribution station.

13. A method for loading a liquid product into a tank compartment of a product transport vehicle, the method comprising:

fluidly coupling the tank compartment of the product transport vehicle to a transfer line at a loading station, the tank compartment comprising a valve regulating a flow of liquid product into the tank compartment and having a normally locked state;

establishing a communication path between a system controller of the product transport vehicle and a loading system at the loading station;

receiving a shipping volume from the loading system, wherein the shipping volume is the volume of liquid product scheduled to be loaded into the tank compartment;

comparing the shipping volume to a tank compartment volume of the tank compartment, wherein the tank compartment volume is a total volume of the tank compartment and the tank compartment volume is stored in the storage medium or determined from a signal received from a level sensor;

maintaining the valve in the normally locked state based on the comparison of the shipping volume and the tank compartment volume to prevent the flow of liquid product into the tank compartment; and transitioning the valve from the normally locked state to an unlocked state based on the comparison of the shipping volume and the tank compartment volume, thereby permitting the flow of liquid product into the tank compartment.

14. The method of claim 13, further comprising:
sensing an amount of liquid product present in the tank compartment with a pressure sensor positioned in the tank compartment;

transmitting a pressure signal to the system controller indicative of the sensed amount of liquid product present in the tank compartment;

determining a retained volume of liquid product in the tank compartment from the pressure signal;

calculating an available volume in the tank compartment by subtracting the retained volume from the tank compartment volume;

comparing the available volume in the tank compartment to the shipping volume;

maintaining the valve in the normally locked state based on the comparison of the shipping volume and the available volume in the tank compartment to prevent the flow of liquid product into the tank compartment; and transitioning the valve from the normally locked state to an unlocked state based on the comparison of the shipping volume and the available volume in the tank compartment, thereby permitting the flow of liquid product into the tank compartment.

15. A product delivery system, comprising:

a product transport vehicle and a cloud system disposed at a location remote from the product transport vehicle, wherein the cloud system is communicatively coupled to the product transport vehicle through a network;

wherein the product transport vehicle comprises:

at least one tank compartment for containing a liquid product;

at least one valve coupled to the tank compartment, the valve regulating a flow of the liquid product into and out of the tank compartment and having a normally locked state;

a network interface device operable to establish a communication path with one or more external systems; and a system controller communicatively coupled to the valve and the network interface device, the system controller comprising a processor and a storage medium containing computer readable and executable instructions, when executed by the processor, cause the system controller to:

receive one or more signals indicative of events, alarms, errors, or combinations of these from one or more instruments coupled to the product transport vehicle; and transmit one or more signal packets to the cloud system via the network interface device, wherein each signal packet is indicative of one or more of the events, alarms, errors, or combinations of these indicated by the one or more signals received and each signal packet includes time stamp information, GPS information, or both for each of the events, alarms, errors, or combinations of these;

wherein the cloud system comprises at least one cloud system processor and at least one cloud system storage medium containing cloud system computer readable and executable instructions that, when executed by the cloud system processor, cause the cloud system to:

receive the one or more signal packets indicative of one or more events, alarms, errors, or combinations of these from the network interface device through the network;

process the one or more signal packets; and determine a condition of the product transport vehicle based on processing the one or more signal packets.

16. The product delivery system of claim 15, wherein processing the one or more signal packets comprises stitching together a plurality of events, alarms, errors, or combinations of these indicated by the one or more signal packets received by the cloud system based at least in part on the time stamp information, GPS information, or both associated with the one or more signal packets.

17. The product delivery system of claim 15, wherein the cloud system comprises a user interface disposed at a remote location from the cloud system and the product transport vehicle and communicatively coupled to the cloud system through the network and the cloud system computer readable and executable instructions, when executed by the cloud system processor, cause the cloud system to display one or more conditions of the product delivery vehicle on the user interface.

18. The product delivery system of claim 15, wherein the cloud system computer readable and executable instructions, when executed by the cloud system processor, cause the cloud system to:
receive temperature information for each tank compartment of the product transport vehicle; and
display the temperature information for each tank compartment of the product transport vehicle on a user interface.

19. The product delivery system of claim 15, wherein the network interface device comprises a network interface device processor, a GPS receiver, and at least one network interface device storage medium comprising network interface device computer readable and executable instructions that, when executed by the network interface device processor, causes the network interface device to:
append each signal packet from the system controller with a time stamp and GPS information to produce the one or more signal packets; and
transmit the one or more signal packets to the cloud system via the network.

20. The product delivery system of claim 15, wherein:
the cloud system computer readable and executable instructions, when executed by the cloud system processor, cause the cloud system to:
receive geolocation information for one or more loading stations, distributions stations, or both from the network;
define a geofencing region from the geolocation information received for the loading stations, distributions stations, or both;
the computer readable and executable instructions, when executed by the processor, cause the system controller to:
receive the geofencing region from the cloud system;
compare a GPS location of the product transport vehicle with the geofencing region; and
maintain the at least one valve in the normally locked state based on the comparison of the GPS location of the product transport vehicle to the geofencing region to prevent the flow of the liquid product into or out of the at least one tank compartment when the product transport vehicle is outside of the geofencing region.

* * * * *